US009749779B2

(12) United States Patent
Moon et al.

(10) Patent No.: US 9,749,779 B2
(45) Date of Patent: Aug. 29, 2017

(54) METHOD AND SYSTEM FOR ESTABLISHING LOCAL ROUTING IN MOBILE COMMUNICATION NETWORK

(75) Inventors: Sang Jun Moon, Seoul (KR); Sang Do Lee, Hwaseong-si (KR); Jong Woo Hong, Seoul (KR); Hyeon Jin Kang, Seoul (KR); Ji Hye Ha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 12/639,349

(22) Filed: Dec. 16, 2009

(65) Prior Publication Data

US 2010/0157900 A1 Jun. 24, 2010

(30) Foreign Application Priority Data

Dec. 24, 2008 (KR) ........................ 10-2008-0132914

(51) Int. Cl.
*H04W 4/02* (2009.01)
*H04L 29/08* (2006.01)
*H04W 80/04* (2009.01)

(52) U.S. Cl.
CPC ............... *H04W 4/02* (2013.01); *H04L 67/18* (2013.01); *H04W 80/04* (2013.01)

(58) Field of Classification Search
CPC .............................. H04W 80/04; H04W 28/04
USPC .................................................. 370/328, 338
See application file for complete search history.

(56) References Cited

U.S. PATENT DOCUMENTS

| | | | | |
|---|---|---|---|---|
| 7,042,855 | B1 * | 5/2006 | Gilchrist et al. | 370/328 |
| 2009/0061922 | A1 * | 3/2009 | Ergen et al. | 455/525 |
| 2009/0098890 | A1 * | 4/2009 | Vasudevan et al. | 455/458 |
| 2009/0156213 | A1 * | 6/2009 | Spinelli et al. | 455/436 |
| 2009/0286540 | A1 * | 11/2009 | Huber et al. | 455/435.1 |
| 2010/0008299 | A1 | 1/2010 | Shin et al. | |

FOREIGN PATENT DOCUMENTS

| | | | |
|---|---|---|---|
| KR | 10-2004-0051359 | A | 6/2004 |
| KR | 10-2008-0052299 | A | 6/2008 |

* cited by examiner

*Primary Examiner* — Muthuswamy Manoharan
(74) *Attorney, Agent, or Firm* — Jefferson IP Law, LLP

(57) ABSTRACT

A method and a system for establishing a local routing in a mobile communication network, and for allowing different mobile stations connected with the same Access Service Network GateWay (ASN GW) to transmit and receive traffic without delivering such traffic to a Home Agent (HA) are provided. In the method, a session server determines whether first and second mobile stations are connected with the same ASN GW by using their location information. In case of a connection with the same ASN GW, the session server establishes a local routing in the ASN GW so that traffic between the first and second mobile stations is directly routed to each other at the ASN GW. Then the ASN GW receiving the traffic from one of both mobile stations transmits the traffic to the other according to the local routing.

12 Claims, 25 Drawing Sheets

210 MS1 BS1 (GRE1) 230 250 ASN GW (MIP1) 260 HA1 270 HA2 (MIP2) MS2 BS2 (GRE2) 220 240 ASN CSN

(A) CONVENTIONAL ASN GW Forwarding Table

| | Incoming Interface | (Source, Destination) | Outgoing Interface |
|---|---|---|---|
| MIP Forwarding | GRE1 | [MS1, *] | MIP1 |
| | GRE2 | [MS2, *] | MIP2 |
| | MIP1 | [*, MS1] | GRE1 |
| | MIP2 | [*, MS2] | GRE2 |

1020

(B) IMPROVED ASN GW Forwarding Table

| | Incoming Interface | (Source, Destination) | Outgoing Interface |
|---|---|---|---|
| Local Routing | GRE1 | [MS1, MS2] | GRE2 |
| | GRE2 | [MS2, MS1] | GRE1 |
| MIP Forwarding | GRE1 | [MS1, *] | MIP1 |
| | GRE2 | [MS2, *] | MIP2 |
| | MIP1 | [*, MS1] | GRE1 |
| | MIP1 | [*, MS2] | GRE2 |

(A) CONVENTIONAL ASN GW Forwarding Table

| | Incoming Interface | (Source, Destination) | Outgoing Interface |
|---|---|---|---|
| MIP Forwarding | GRE1 | (MS1, *) | MIP1 |
| | MIP1 | (*, MS1) | GRE1 |
| Normal Routing | * | (*, Local Server) | Local I/F |
| | * | (*, *) | Ext I/F |

1220

(B) IMPROVED ASN GW Forwarding Table

| | Incoming Interface | (Source, Destination) | Outgoing Interface |
|---|---|---|---|
| Local Routing | GRE1 | (MS1, Local Server) | Local I/F |
| | Local I/F | (Local Server, MS1) | GRE1 |
| MIP Forwarding | GRE1 | (MS1, *) | MIP1 |
| | MIP1 | (*, MS1) | GRE1 |
| Normal Routing | * | (*, Local Server) | Local I/F |
| | * | (*, *) | Ext I/F |

(A) CONVENTIONAL ASN GW Forwarding Table

| | Incoming Interface | (Source, Destination, CID) | Outgoing Interface |
|---|---|---|---|
| MIP Forwarding | GRE1 | (MS1, *, *) | MIP1 |
| | GRE2 | (MS2, *, *) | MIP2 |
| | * | (*, MS1, *) | GRE1 |
| | * | (*, MS2, *) | GRE2 |

1520

(B) IMPROVED ASN GW Forwarding Table

| | Incoming Interface | (Source, Destination, CID) | Outgoing Interface |
|---|---|---|---|
| Local Routing | GRE1a | (* , MS2, LR CIDs) | GRE2a |
| | GRE2a | (* , MS1, LR CIDs) | GRE1a |
| MIP Forwarding | GRE1 | (MS1, *, *) | MIP1 |
| | GRE2 | (MS2, *, *) | MIP2 |
| | * | (*, MS1, *) | GRE1 |
| | * | (*, MS2, *) | GRE2 |

(A) CONVENTIONAL ASN GW Forwarding Table

| | Incoming Interface | (Source, Destination, CID) | Outgoing Interface |
|---|---|---|---|
| MIP Forwarding | GRE1 | [MS1, *, *] | MIP1 |
| | GRE2 | [MS2, *, *] | MIP2 |
| | * | [*, MS1, *] | GRE1 |
| | * | [*, MS2, *] | GRE2 |

1620

(B) IMPROVED ASN GW Forwarding Table

| | Incoming Interface | (Source, Destination, CID) | Outgoing Interface |
|---|---|---|---|
| Local Routing | GRE1 | [* , MS2, LR CIDs] | GRE2 |
| | GRE2 | [* , MS1, LR CIDs] | GRE1 |
| MIP Forwarding | GRE1 | [MS1, *, *] | MIP1 |
| | GRE2 | [MS2, *, *] | MIP2 |
| | * | [*, MS1, *] | GRE1 |
| | * | [*, MS2, *] | GRE2 |

(A) CONVENTIONAL ASN GW Forwarding Table

| | Incoming Interface | (Source, Destination, CID) | Outgoing Interface |
|---|---|---|---|
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

1820

(B) IMPROVED ASN GW Forwarding Table

| | Incoming Interface | (Source, Destination, CID) | Outgoing Interface |
|---|---|---|---|
| Local Routing | GRE1a | (*, Local Server, LR CIDs) | Local I/F |
| | Local I/F | (*, MS1, LR CIDs) | GRE1a |
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

(A) CONVENTIONAL ASN GW Forwarding Table

| | Incoming Interface | (Source, Destination, CID) | Outgoing Interface |
|---|---|---|---|
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

1920

(B) IMPROVED ASN GW Forwarding Table

| | Incoming Interface | (Source, Destination, CID) | Outgoing Interface |
|---|---|---|---|
| Local Routing | GRE1 | (*, Local Server, LR CIDs) | Local I/F |
| | Local I/F | (*, MS1, LR CIDs) | GRE1 |
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

(A) CONVENTIONAL ASN GW Forwarding Table

| | Incoming Interface | (Source, Destination, CID) | Outgoing Interface |
|---|---|---|---|
| MIP Forwarding | GRE1 | [MS1, *, *] | MIP1 |
| | GRE2 | [MS2, *, *] | MIP2 |
| Normal Routing | * | [*, MS1, *] | GRE1 |
| | * | [*, MS2, *] | GRE2 |

2220

(B) IMPROVED ASN GW Forwarding Table

| | Incoming Interface | (Source, Destination, CID) | Outgoing Interface |
|---|---|---|---|
| Local Routing | GRE1a | [*, MS2, LR CIDs] | GRE2a |
| | GRE2a | [*, MS1, LR CIDs] | GRE1a |
| MIP Forwarding | GRE1 | [MS1, *, *] | MIP1 |
| | GRE2 | [MS2, *, *] | MIP2 |
| Normal Routing | * | [*, MS1, *] | GRE1 |
| | * | [*, MS2, *] | GRE2 |

(A) CONVENTIONAL ASN GW Forwarding Table

| | Incoming Interface | (Source, Destination, CID) | Outgoing Interface |
|---|---|---|---|
| MIP Forwarding | GRE1 | (MS1, *, *) | MIP1 |
| | GRE2 | (MS2, *, *) | MIP2 |
| Normal Routing | * | (*, MS1, *) | GRE1 |
| | * | (*, MS2, *) | GRE2 |

2320

(B) IMPROVED ASN GW Forwarding Table

| | Incoming Interface | (Source, Destination, CID) | Outgoing Interface |
|---|---|---|---|
| Local Routing | GRE1 | (*, MS2, LR CIDs) | GRE2 |
| | GRE2 | (*, MS1, LR CIDs) | GRE1 |
| MIP Forwarding | GRE1 | (MS1, *, *) | MIP1 |
| | GRE2 | (MS2, *, *) | MIP2 |
| Normal Routing | * | (*, MS1, *) | GRE1 |
| | * | (*, MS2, *) | GRE2 |

(A) CONVENTIONAL ASN GW Forwarding Table

| | Incoming Interface | (Source, Destination, CID) | Outgoing Interface |
|---|---|---|---|
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

2520

(B) IMPROVED ASN GW Forwarding Table

| | Incoming Interface | (Source, Destination, CID) | Outgoing Interface |
|---|---|---|---|
| Local Routing | GRE1a | (*, Local Server, LR CIDs) | Local I/F |
| | Local I/F | (*, MS1, LR CIDs) | GRE1a |
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

(A) CONVENTIONAL ASN GW Forwarding Table

| | Incoming Interface | (Source, Destination, CID) | Outgoing Interface |
|---|---|---|---|
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

2620

(B) IMPROVED ASN GW Forwarding Table

| | Incoming Interface | (Source, Destination, CID) | Outgoing Interface |
|---|---|---|---|
| Local Routing | GRE1 | (*, Local Server, LR CIDs) | Local I/F |
| | Local I/F | (*, MS1, LR CIDs) | GRE1 |
| MIP Forwarding | GRE1 | (MS1, *, *) | MIP1 |
| | MIP1 | (*, MS1, *) | GRE1 |
| Normal Routing | * | (*, Local Server, *) | Local I/F |
| | * | (*, *, *) | Ext I/F |

METHOD AND SYSTEM FOR ESTABLISHING LOCAL ROUTING IN MOBILE COMMUNICATION NETWORK

PRIORITY

This application claims the benefit under 35 U.S.C. §119 (a) of a Korean patent application filed in the Korean Intellectual Property Office on Dec. 24, 2008 and assigned Serial No. 10-2008-0132914, the entire disclosure of which is hereby incorporated by reference.

BACKGROUND OF THE INVENTION

1. Field of the Invention

The present invention relates to a local routing establishment technique in a mobile communication network. More particularly, the present invention relates to a system and method for establishing a local routing which may allow different mobile stations connected together with the same Access Service Network GateWay (ASN GW) to transmit and receive traffic without delivering such traffic to a Home Agent (HA) by using their location information.

2. Description of the Related Art

A mobile WiMax network refers to a wireless network that supports services based on the Institute of Electrical and Electronics Engineers IEEE 802.16e-2005 standard. The IEEE 802.16e-2005 standard, which is the basis of mobile WiMax, adds mobility supportable technologies, such as handover and paging, to the original IEEE 802.16-2004 standard which is frequently referred to as a fixed WiMax.

Typically, the mobile WiMax network includes a Mobile Station (MS) or Subscriber Station (SS), an Access Service Network (ASN), and a Connectivity Service Network (CSN). The ASN includes a Base Station (BS) and an ASN GateWay (ASN GW). The CSN includes a Pre-Paid Service (PPS) server and an Authentication, Authorization and Accounting (AAA) server.

The mobile WiMax network may often use a Proxy Mobile Internet Protocol (PMIP) to provide Layer-3 (L3) mobility between the ASN GWs. For the above, the ASN GW acts as an agent of the PMIP, and there exists an MIP Home Agent (HA) in the CSN.

In a conventional mobile WiMax network, even though the same ASN GW connects different mobile stations, their traffic must always pass through the HA. If traffic between MSs is interactive in real time, such delivery of traffic to and from the HA may cause an unnecessary delay. Furthermore, in case of MSs available for a roaming service, such traffic delay may become more serious due to a greater physical distance between the ASN GW and the HA.

Therefore, there is a need to allow traffic to be transmitted and received without passing through the HA when different MSs are connected together with the same ASN GW.

SUMMARY OF THE INVENTION

An aspect of the present invention is to address the above-mentioned problems and/or disadvantages and to provide at least the advantages described below. Accordingly, an aspect of the present invention is to provide an Access Service Network GateWay (ASN GW) which allows transmitting and receiving traffic without delivering such traffic to a Home Agent (HA) when different mobile stations are connected together with the same ASN GW.

In accordance with an aspect of the present invention, a method for establishing a local routing in a mobile communication network is provided. The method includes at a session server, receiving a session request message from a first mobile station through an ASN GW and determining location information about the first mobile station, at the session server, receiving a session response message from a second mobile station through the ASN GW and determining location information about the second mobile station, at the session server, determining whether the first mobile station and the second mobile station are connected with the same ASN GW, by using the location information about both the first mobile station and the second mobile station, if it is determined that the first mobile station and the second mobile station are connected with the same ASN GW, establishing, at the session server, a local routing in the ASN GW so that traffic between the first mobile station and the second mobile station is directly routed to each other at the ASN GW, and at the ASN GW, when receiving the traffic from one of the first mobile station and the second mobile station, transmitting the traffic to the other according to the local routing.

In accordance with another aspect of the present invention, a method for establishing a local routing in a mobile communication network is provided. The method includes at a second mobile station, receiving a session request message from a first mobile station through an ASN GW and determining location information about the first mobile station, at the second mobile station, determining whether the first mobile station and the second mobile station are connected with the same ASN GW, and, if it is determined that the first mobile station and the second mobile station are connected with the same ASN GW, establishing a first local routing with the first mobile station in the ASN GW so that traffic toward the first mobile station is directly routed to the first mobile station at the ASN GW, at the first mobile station, receiving a session response message from the second mobile station through the ASN GW and determining location information about the second mobile station, at the first mobile station, determining whether the first mobile station and the second mobile station are connected with the same ASN GW, and, if it is determined that the first mobile station and the second mobile station are connected with the same ASN GW, establishing a second local routing with the second mobile station in the ASN GW so that traffic toward the second mobile station is directly routed to the second mobile station at the ASN GW, and at the ASN GW, when receiving the traffic from one of the first mobile station and the second mobile station, transmitting the traffic to the other according to the first local routing and the second local routing.

In accordance with still another aspect of the present invention, a method for establishing a local routing in a mobile communication network is provided. The method includes at a local server, receiving a session request message from a first mobile station through an ASN GW and sending a session response message in response to the session request message, at the first mobile station, determining location information about the local server by receiving the session response message, and determining whether the first mobile station and the local server are connected with the same ASN GW, at the first mobile station, if it is determined that the first mobile station and the local server are connected with the same ASN GW, establishing a local routing in the ASN GW so that traffic between the first mobile station and the local server is directly routed to each other at the ASN GW, and at the ASN GW, when receiving the traffic from one of the first mobile station and the local server, transmitting the traffic to the other according to the local routing.

In accordance with yet another aspect of the present invention, a system for establishing a local routing in a mobile communication network is provided. The system includes a first mobile station configured to send a session request message to a session server, the session request message comprising location information about the first mobile station, a second mobile station configured to send a session response message to the session server, the session response message comprising location information about the second mobile station, wherein the session server is configured to determine whether the first mobile station and the second mobile station are connected with the same ASN GW by using the location information about both the first mobile station and the second mobile station, and if it is determined that the first mobile station and the second mobile station are connected with the same ASN GW, to establish a local routing in the ASN GW so that traffic between the first mobile station and the second mobile station is directly routed to each other at the ASN GW, and wherein the ASN GW is configured to transmit the traffic to the other according to the local routing when receiving the traffic from one of the first mobile station and the second mobile station.

In accordance with further another aspect of the present invention, a system for establishing a local routing in a mobile communication network is provided. The system includes a second mobile station configured to determine whether a first mobile station and the second mobile station are connected with the same ASN GW by receiving a session request message containing location information from the first mobile station, and if it is determined that the first mobile station and the second mobile station are connected with the same ASN GW, to establish a first local routing with the first mobile station in the ASN GW so that traffic toward the first mobile station is directly routed to the first mobile station at the ASN GW, wherein the first mobile station is configured to determine whether the first mobile station and the second mobile station are connected with the same ASN GW by receiving a session response message containing location information from the second mobile station, and if it is determined that the first mobile station and the second mobile station are connected with the same ASN GW, to establish a second local routing with the second mobile station in the ASN GW so that traffic toward the second mobile station is directly routed to the second mobile station at the ASN GW, and wherein the ASN GW is configured to, when receiving the traffic from one of the first mobile station and the second mobile station, transmit the traffic to the other according to the first local routing and the second local routing.

In accordance with still further aspect of the present invention, a system for establishing a local routing in a mobile communication network is provided. The system includes a local server configured to, when receiving a session request message from a first mobile station through an ASN GW, send a session response message in response to the session request message, wherein the first mobile station is configured to acquire location information about the local server by receiving the session response message, to determine whether the first mobile station and the local server are connected with the same ASN GW, and if it is determined that the first mobile station and the local server are connected with the same ASN GW, to establish a local routing in the ASN GW so that traffic between the first mobile station and the local server is directly routed to each other at the ASN GW, and wherein the ASN GW is configured to, when receiving the traffic from one of the first mobile station and the local server, transmit the traffic to the other according to the local routing.

Since no traffic is delivered to the HA when different mobile stations are connected together with the same ASN GW, aspects of the present invention can reduce a traffic delay in comparison with a typical case where traffic is always delivered to the HA. More particularly, if mobile stations are available for a roaming service, such a traffic delay may be reduced even more in view of a greater physical distance between the ASN GW and the HA. Additionally, aspects of the present invention may prevent unnecessary traffic transmission between the ASN GW and the HA.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 10 is a view which illustrates a packet forwarding table of an ASN GW according to a type A of the first exemplary embodiment of the present invention;

FIG. 12 is a view which illustrates a packet forwarding table of an ASN GW according to a type B of the first exemplary embodiment of the present invention;

FIG. 15 is a view which illustrates a packet forwarding table of an ASN GW according to a type A of the second exemplary embodiment of the present invention;

FIG. 16 is a view which illustrates another packet forwarding table of an ASN GW according to a type A of the second exemplary embodiment of the present invention;

FIG. 18 is a view which illustrates a packet forwarding table of an ASN GW according to a type B of the second exemplary embodiment of the present invention;

FIG. 19 is a view which illustrates another packet forwarding table of an ASN GW according to a type B of the second exemplary embodiment of the present invention;

FIG. 22 is a view which illustrates a packet forwarding table of an ASN GW according to a type A of the third exemplary embodiment of the present invention;

FIG. 23 is a view which illustrates another packet forwarding table of an ASN GW according to a type A of the third exemplary embodiment of the present invention;

FIG. 25 is a view which illustrates a packet forwarding table of an ASN GW according to a type B of the third exemplary embodiment of the present invention; and FIG. 26 is a view which illustrates another packet forwarding table of an ASN GW according to a type B of the third exemplary embodiment of the present invention.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents. In addition, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Hereinafter, the present invention will be described in detail with reference to three exemplary embodiments.

The first exemplary embodiment addresses a case in which a session server finds the location of each mobile station or a local server and then requests a local routing.

The second exemplary embodiment is similar to the first exemplary embodiment in that a session server requests a local routing, but is different in that a new service flow is added for traffic in a local routing and further a Local Routing Connection ID (LR CID) is assigned to the added flow.

The third exemplary embodiment addresses a case in which a mobile station finds the location of another mobile station or a local server and then requests a local routing.

Each of the above exemplary embodiments is classified into two types A and B. Type A addresses a case in which a local routing is established between different mobile stations, namely, a first mobile station and a second mobile station.

Type B addresses a case in which the second mobile station is a local server, that is, the case where a local routing is established between a mobile station and a local server.

Figure 1:
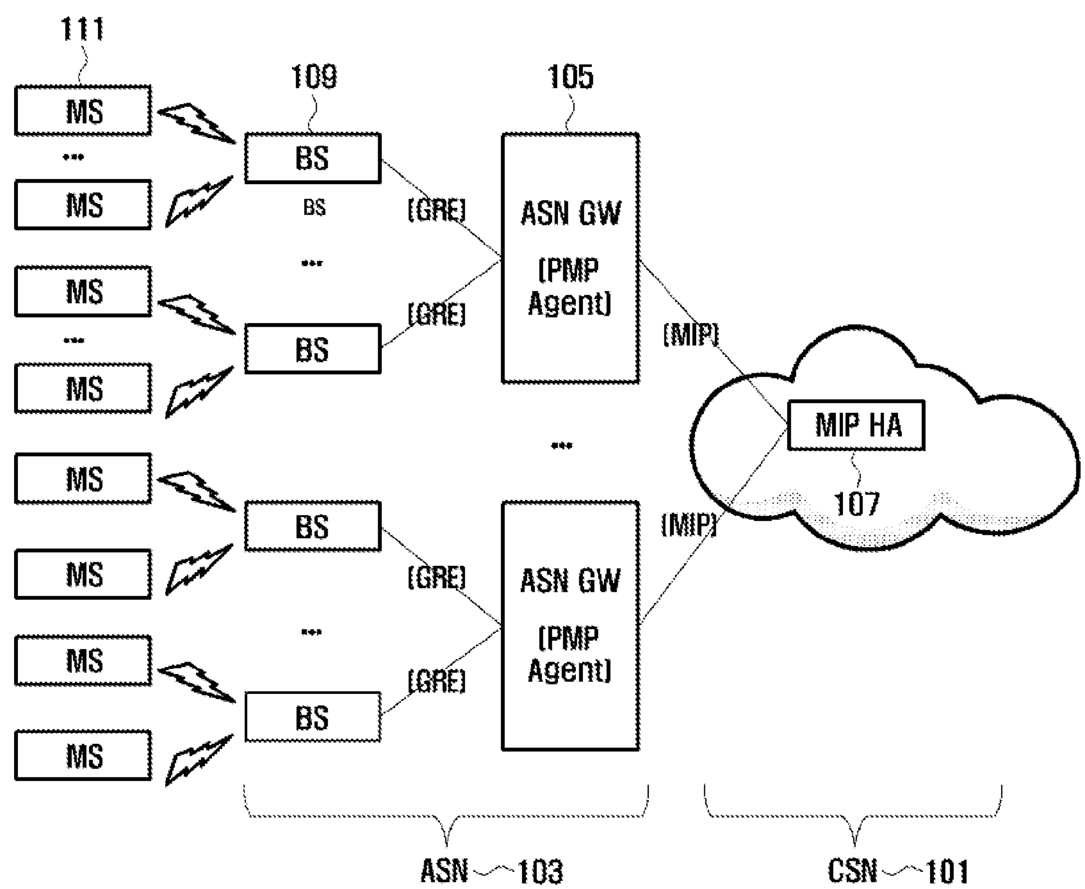
FIG. 1 is a schematic view which illustrates a structure of a conventional WiMax network using the Proxy Mobile Internet Protocol (PMIP)

FIG. 1 is a schematic view which illustrates a structure of a conventional WiMax network using a Proxy Mobile Internet Protocol (PMIP).

Referring to FIG. 1, a WiMax network includes a Connectivity Service Network (CSN) 101 and an Access Service Network (ASN) 103. The CSN 101 provides mobile stations with connections of application services such as internet and Voice over Internet Protocol (VoIP), a home agent function of mobile IP, or an authentication and accounting function. The ASN 103 not only controls the base stations that offer a wireless access, but also provides connections with the CSN 101.

As shown in FIG. 1, a number of ASN GateWays (ASN GW) 105 are connected together with the same Home Agent (HA) 107. Although not illustrated in FIG. 1, the ASN gateways 105 may be connected individually with different HAs. In addition, a plurality of Base Stations (BS) 109 are connected with each individual ASN GW 105, and a plurality of Mobile Stations (MS) 111 are connected with each individual BS 109. The connection between a BS 109 and an ASN GW 105 uses a Generic Routing Encapsulation (GRE)

tunnel. And the connection between an ASN GW 105 and the HA 107 uses a Mobile IP (MIP) tunnel for supporting PMIP to each MS 111.

Figure 2:
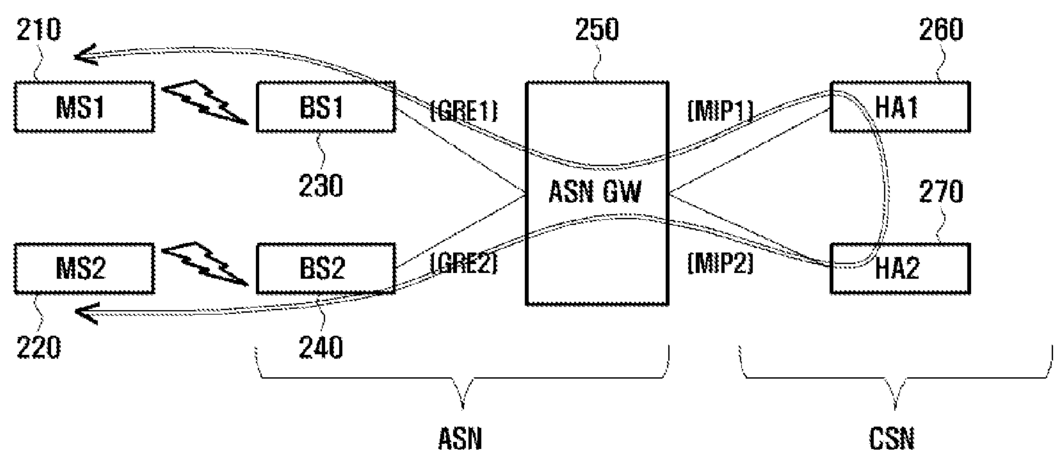
FIG. 2 is a view which illustrates a traffic flow between different Mobile Stations (MSs) in a conventional WiMax network.

FIG. 2 is a view which illustrates a traffic flow between different mobile stations in a conventional WiMax network.

Referring to FIG. 2, a first MS (MS1) 210 and a second MS (MS2) 220 are respectively connected with different Base Stations (BSs), namely, a first BS (BS1) 230 and a second BS (BS2) 240. Although the respective MSs 210 and 220 are connected with different BSs 230 and 240, the first and second BSs 230 and 240 are connected together with the same ASN GW 250 through GRE1 and GRE2 tunnels.

In addition, a first HA (HA1) 260 for the first MS 210 is connected with the ASN GW 250 through MIP1 tunnel, and a second HA (HA2) 270 for the second MS 220 is connected with the ASN GW 250 through MIP2 tunnel.

As naturally understood from FIG. 2, although the first MS (MS1) 210 and the second MS (MS2) 220 are connected together with the same ASN GW 250, traffic transmitted and received therebetween should pass through the first HA 260 and the second HA 270. Unfortunately, this may cause unnecessary delay and loss of traffic.

Figure 3:
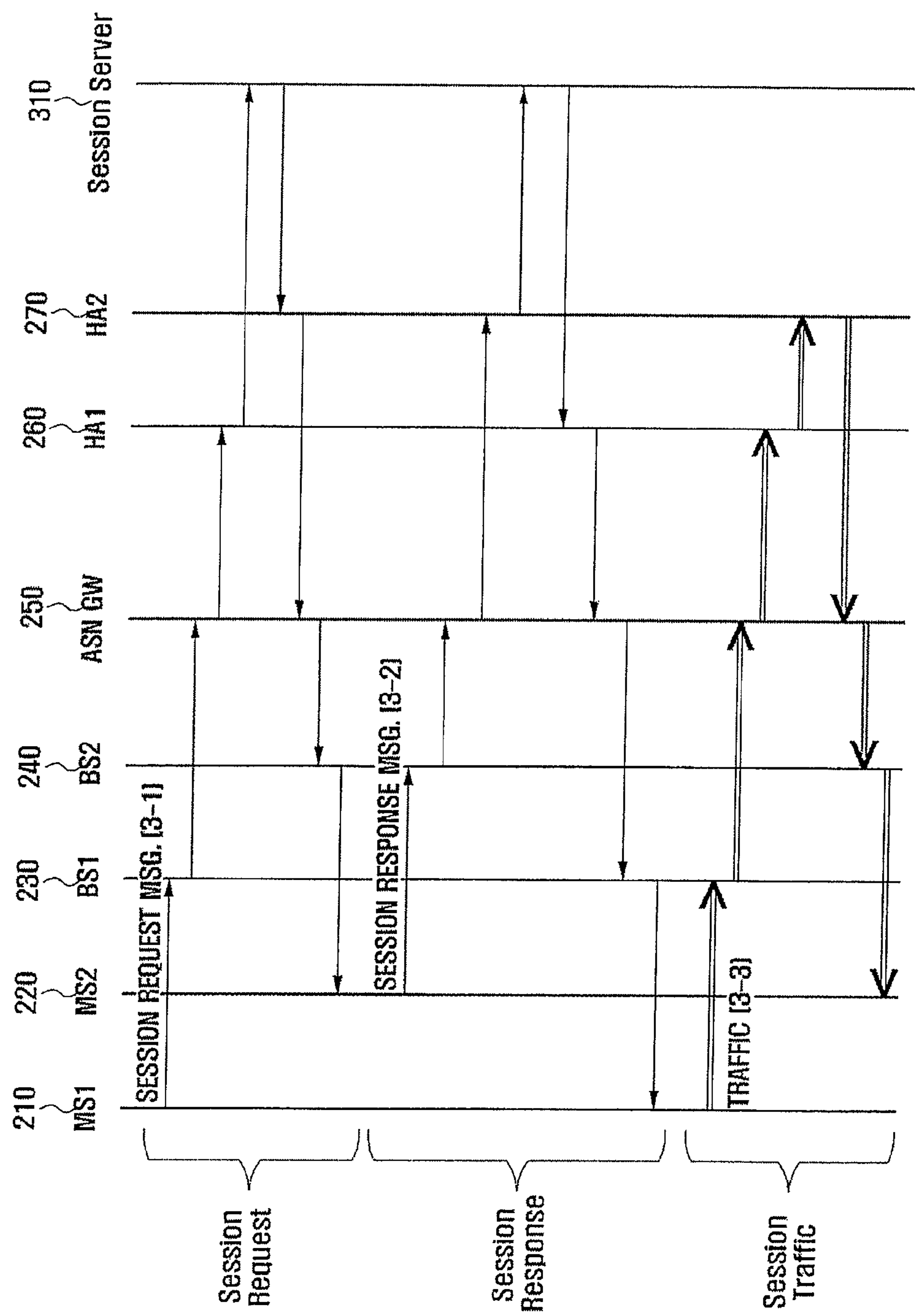
FIG. 3 is a flow diagram which illustrates a process of transmitting and receiving traffic after a session establishment by a session server in a conventional WiMax network shown in FIG. 2.

FIG. 3 is a flow diagram which illustrates a process of transmitting and receiving traffic after a session establishment by a session server in a conventional WiMax network shown in FIG. 2.

Referring to FIG. 3, the session server 310 establishes a session between the MSs or between the MS and a local server.

As shown in FIG. 3, the first MS (MS1) 210 sends a session request message to BS1 230, which is providing service to MS1 210, to establish a session with the second MS (MS2) 220 in step 3-1. The session request message is then delivered to the session server 310 via the first BS (BS1) 230, the ASN GW 250, and the first HA (HA1) 260. The session server 310 sends the session request message to the second MS (MS2) 220 via the second HA (HA2) 270, the ASN GW 250, and the second BS (BS2) 240.

The second MS (MS2) 220 receiving the session request message sends a session response message for accepting a session establishment with the first MS (MS1) 210 in step 3-2. The session response message is then delivered to the session server 310 via the second BS (BS2) 240, the ASN GW 250, and the second HA (HA2) 270. The session server 310 sends the session response message to the first MS (MS1) 210 via the first HA (HA1) 260, the ASN GW 250, and the first BS (BS1) 230.

By an exchanging of messages for a session establishment between the first MS (MS1) 210 and the second MS (MS2) 220, a session is established to transmit and receive traffic between MSs. If certain traffic to be transmitted is generated in the first MS (MS1) 210, such traffic is sent to the second MS (MS2) 220 after consecutively passing through the first BS (BS1) 230, the ASN GW 250, the first HA (HA1) 260, the second HA (HA2) 270, the ASN GW 250, and the second BS (BS2) 240 in step 3-3.

Therefore, although the first MS (MS1) 210 and the second MS (MS2) 220 are connected together with the same ASN GW 250, unnecessary delay may be caused due to traffic having to pass through the HA.

Figure 4:
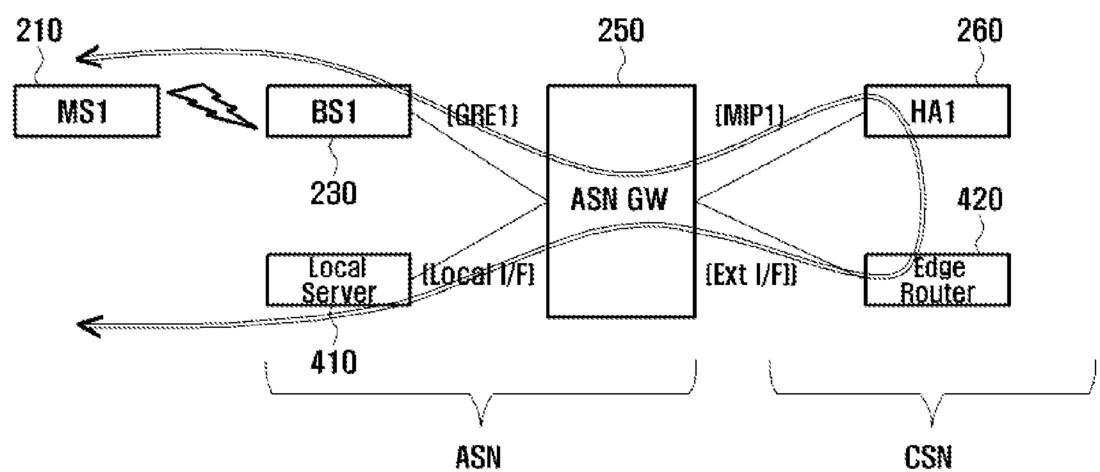
FIG. 4 is a view which illustrates a traffic flow between an MS and a local server in a conventional WiMax network.

FIG. 4 is a view which illustrates a traffic flow between an MS and a local server in a conventional WiMax network. Herein, the repetition of steps that are substantially the same as described with reference to FIG. 2 will be avoided.

Referring to FIG. 4, the local server 410 refers to a particular server which may provide a specific service to a user in a limited area. That is, the local server 410 may be located in a hot zone, a campus, an in-company network, and the like and may offer a specialized service to users in its own service area.

The first MS (MS1) 210 is connected with the WiMax network in substantially the same way as discussed in FIG. 2.

The local server 410 is connected with the ASN GW 250 through a local interface, and the ASN GW 250 is connected with an edge router 420 through an External InterFace (Ext I/F). The edge router 420, an element corresponding to the first HA (HA1) 260 for the first MS (MS1) 210, concentrates traffic and delivers it to the IP backbone of service providers.

Although the first MS (MS1) 210 and the local server 410 are connected together with substantially the same ASN GW 250 as shown in FIG. 4, unnecessary delay may be caused because traffic has to pass through the first HA (HA1) 260 and the edge router 420.

Figure 5:
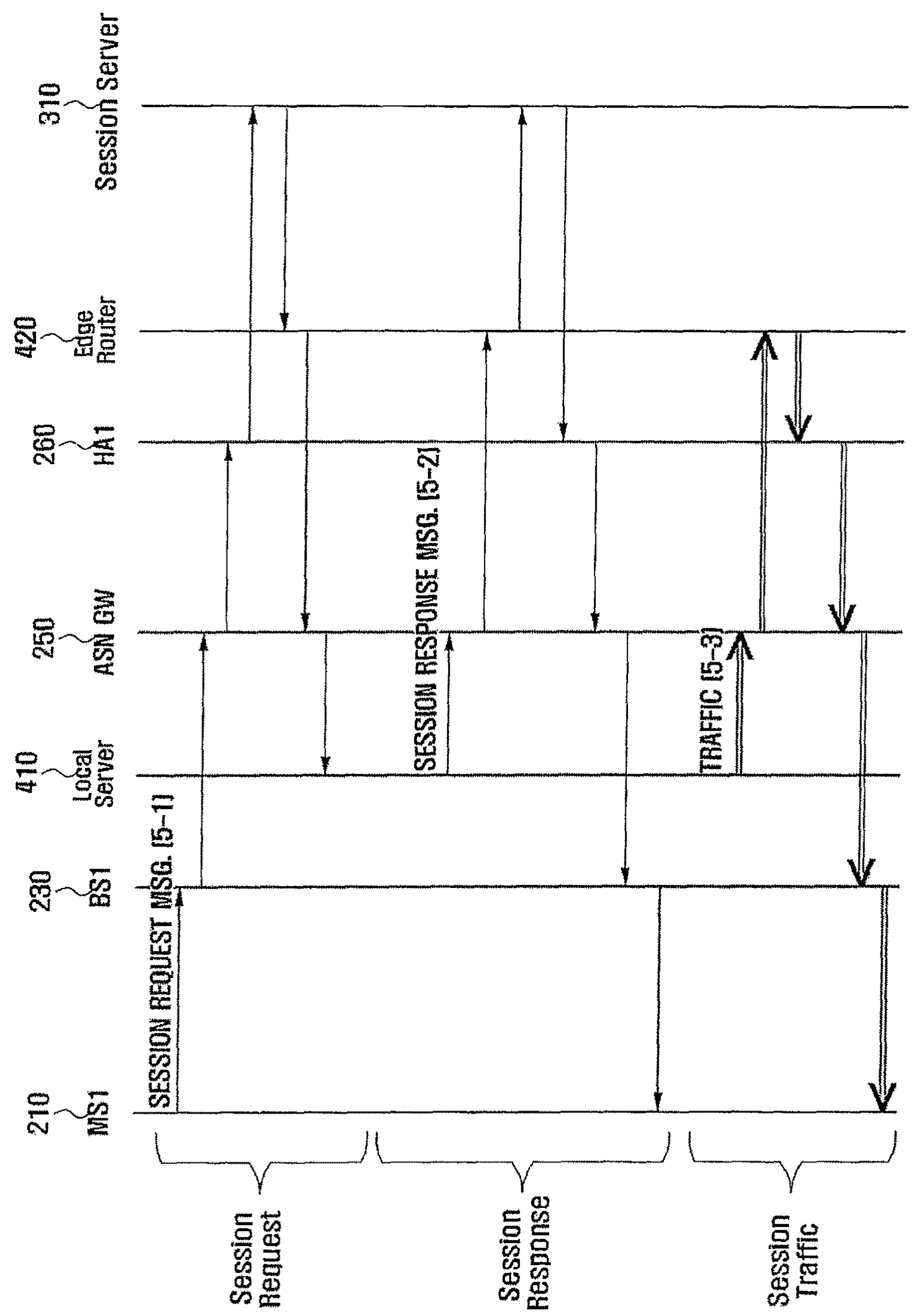
FIG. 5 is a flow diagram which illustrates a process of transmitting and receiving traffic after a session establishment by a session server in a conventional WiMax network shown in FIG. 4.

FIG. 5 is a flow diagram which illustrates a process of transmitting and receiving traffic after session establishment by a session server in a conventional WiMax network as shown in FIG. 4. Herein, the repetition of steps that are substantially the same as described with reference to FIG. 3 will be avoided.

In view of the discussion relative to FIG. 3, steps 5-1 and 5-2 in FIG. 5, in which the first MS (MS1) 210 and the local server 410 exchange session establishment messages will be understood by those skilled in the art.

A session for the delivery of traffic is established between the first MS (MS1) 210 and the local server 410 after messages for session establishment are exchanged. Thereafter, if certain traffic to be transmitted is generated in the local server 410, such traffic is sent to the first MS (MS1) 210 after consecutively passing through the ASN GW 250, the edge router 420, the first HA (HA1) 260, the ASN GW 250, and the first BS (BS1) 230 in step 5-3.

Therefore, although the first MS (MS1) 210 and the local server 410 are connected together with the same ASN GW 250, unnecessary delay may be caused due to traffic having to pass through the first HA (HA1) 260 and the edge router 420.

Figure 6:
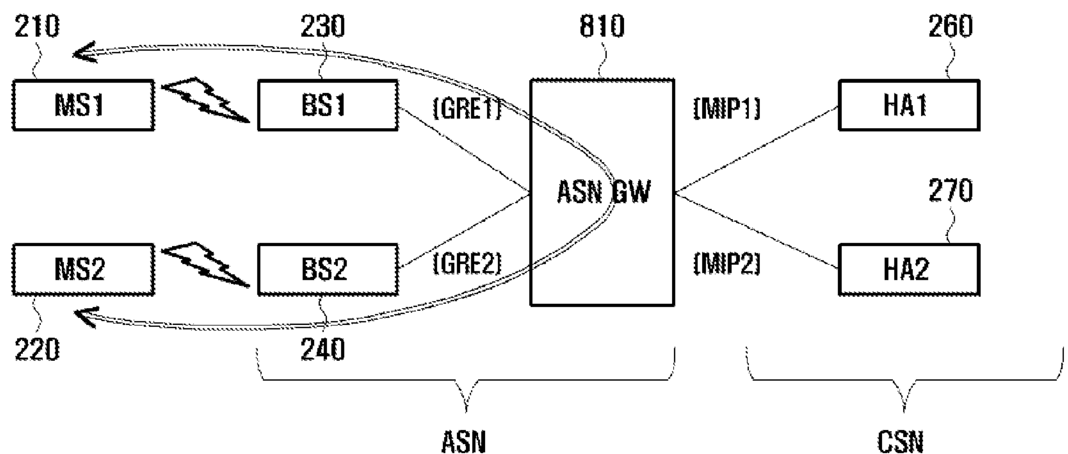
FIG. 6 is a view which illustrates a traffic flow between a first MS and a second MS according to an exemplary embodiment of the present invention.

FIG. 6 is a view which illustrates a traffic flow between a first MS and a second MS according to an exemplary embodiment of the present invention.

Referring to FIG. 6, a session server (not shown) or one of the MSs determines whether the first MS (MS1) 210 and the second MS (MS2) 220 are connected together with the same ASN GW 810, using the location information about the MSs. If the MSs are connected together with the same ASN GW 810, the ASN GW 810 receiving a request for a local routing performs a direct routing of traffic to the respective MSs without delivering such traffic to either the first HA (HA1) 260 or the second HA (HA2) 270. FIG. 6 shows such a traffic flow.

Therefore, since no traffic is unnecessarily delivered to an HA, the transmission of traffic may become faster.

Figure 7:
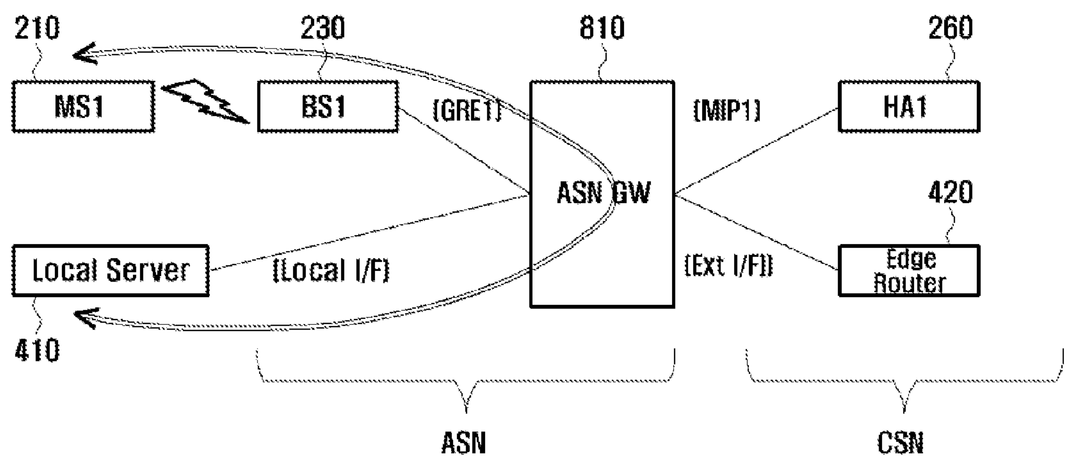
FIG. 7 is a view which illustrates a traffic flow between a first MS and a local server according to an exemplary embodiment of the present invention.

FIG. 7 is a view which illustrates a traffic flow between a first MS and a local server according to an exemplary embodiment of the present invention.

Referring to FIG. 7, the session server (not shown) or one of the MSs determines whether the first MS (MS1) 210 and the local server 410 are connected together with the same ASN GW 810, using their location information. If both are connected together with the same ASN GW 810, the ASN GW 810 receiving a request for a local routing performs a direct routing of traffic to the first MS (MS1) 210 or the local server 410 without delivering such traffic to either the first HA (HA1) 260 or the edge router 420. FIG. 7 shows such a traffic flow.

Therefore, since no traffic is unnecessarily delivered to an HA or an edge router, the transmission of traffic may become faster.

First Exemplary Embodiment

Figure 8:
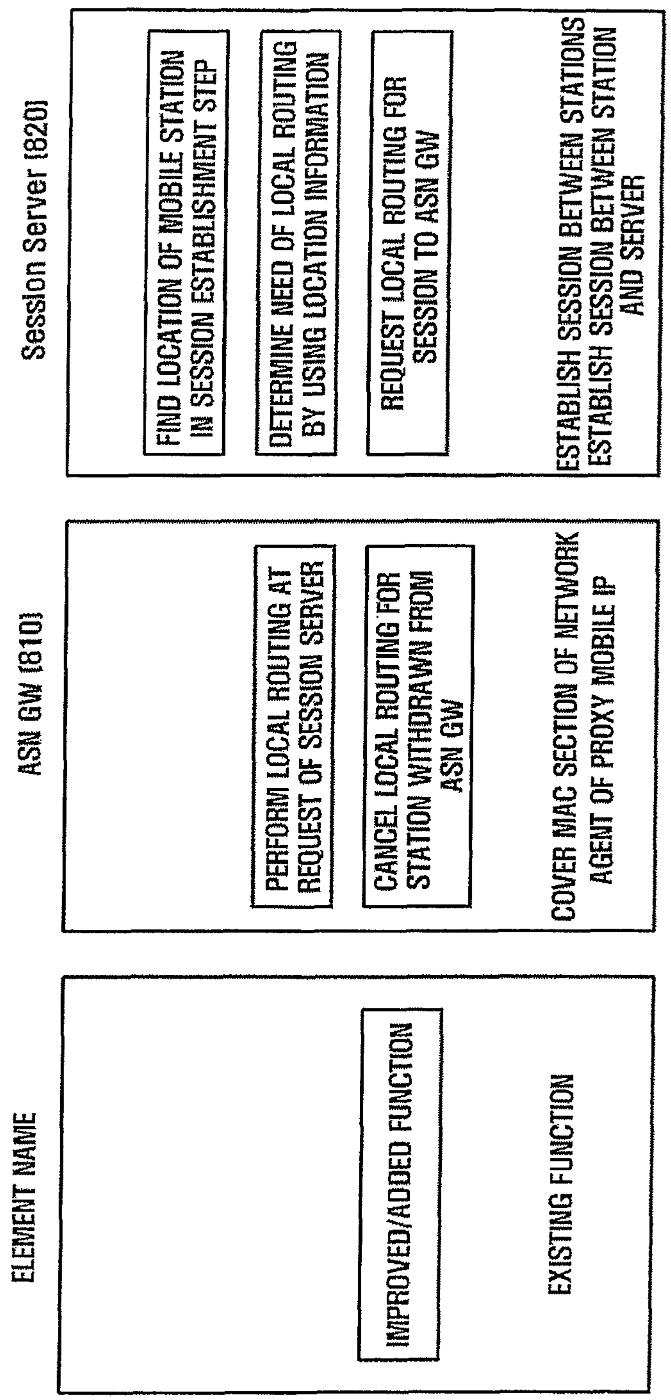
FIG. 8 is a view which illustrates characteristics of an Access Service Network GateWay (ASN GW) and a session server which constitute a system in accordance with a first exemplary embodiment of the present invention.

FIG. 8 is a view which illustrates characteristics of an ASN GW and a session server which constitute a system in accordance with a first exemplary embodiment of the present invention.

Referring to FIG. 8, a session server 820 performs basically a session establishment between MSs or between an MS and a local server.

More particularly, the session server 820, according to the first exemplary embodiment of this invention, ascertains the locations of each MS and the local server in a session establishment step. Additionally, using such location information, the session server 820 determines whether the MSs or both the MS and the local server are connected together with the same ASN GW 810. Then, the session server 820 further determines whether a local routing is needed. That is, when the MSs or both the MS and the local server are connected together with the same ASN GW 810, the session server 820 determines that a local routing is needed. Furthermore, in a case in which a local routing is needed, the session server 820 sends a request for a local routing in the current session to the ASN GW 810.

In an exemplary implementation, the ASN GW 810 is an agent of the PMIP for connections in the Media Access Control (MAC) section.

More particularly, the ASN GW 810, according to the first exemplary embodiment of this invention, receives a request for a local routing from the session server 820. Then the ASN GW 810 performs a direct routing of traffic between the MSs or between the MS and the local server without delivering such traffic to the HA. Additionally, the ASN GW 810 cancels the establishment of a local routing for a certain MS which withdraws from a service area of the ASN GW.

Type A of First Exemplary Embodiment

Described hereinafter is a local routing process of type A in which a local routing is executed between different MSs.

Figure 9:
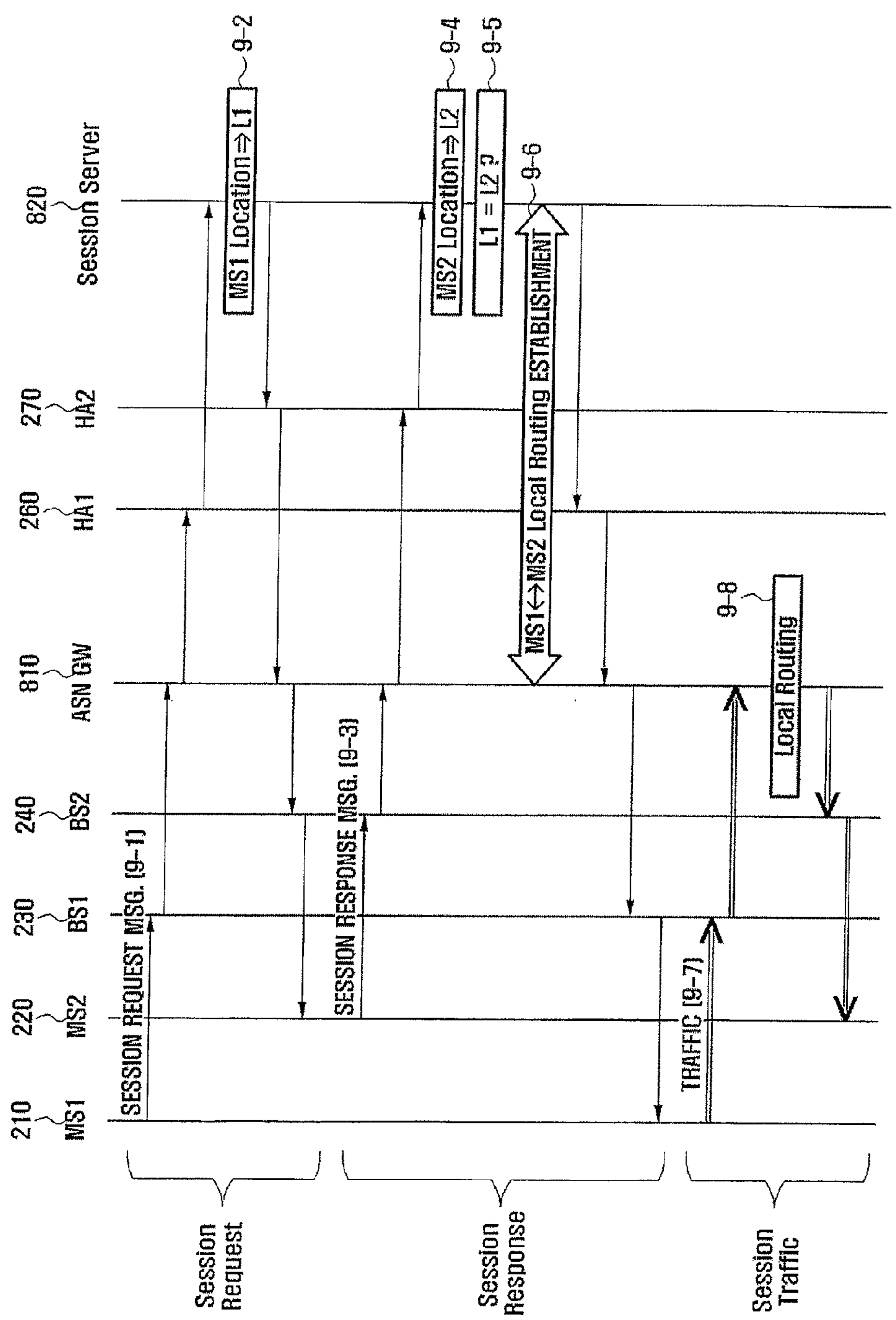
FIG. 9 is a flow diagram which illustrates a process of executing a local routing between different MSs according to a type A of the first exemplary embodiment of the present invention.

FIG. 9 is a flow diagram which illustrates a process of executing a local routing between different MSs according to a type A of the first exemplary embodiment of the present invention.

Referring to FIG. 9, the first MS (MS1) 210 sends a session request message to the first BS (BS1) 230 to establish a session with the second MS (MS2) 220 in step 9-1. The session request message is then delivered to the session server 820 via the first BS (BS1) 230, the ASN GW 810, and the first HA (HA1) 260.

When receiving the session request message, the session server 820 may acquire the location information about the first MS (MS1) 210 in step 9-2.

In order to obtain the location information about the first MS (MS1) 210, the session server 820 may use a known technique such as a location-based IP service using a service interface. Alternatively, if the session request message itself contains the location information about the first MS (MS1) 210, the session server 820 may obtain such location information from the session request message. Thereafter, the session server 820 sends the session request message to the second MS (MS2) 220 via the second HA (HA2) 270, the ASN GW 810, and the second BS (BS2) 240.

When receiving the session request message, the second MS (MS2) 220 sends a session response message, as a response to the session request message, to the session server 820 via the second BS (BS2) 240, the ASN GW 810, and the second HA (HA2) 270 in step 9-3.

Then, in substantially the same way as discussed above in step 9-2, the session server 820 may acquire the location information about the second MS (MS2) 220 in step 9-4. Additionally, the session server 820 compares the location of the first MS (MS1) 210 with the location of the second MS (MS2) 220, and thereby determines whether both MSs are connected with the same ASN GW 810 in step 9-5. In a case in which the MSs are connected with the same ASN GW 810, the session server 820 requests the establishment of a local routing for traffic between the first MS (MS1) 210 and the second MS (MS2) 220 to the ASN GW 810 in step 9-6. Then the session server 820 sends the session response message to the first MS (MS1) 210.

After a session is established, traffic generated in the first MS (MS1) 210 is transmitted to the ASN GW 810 in step 9-7. The ASN GW 810 performs a direct routing of such traffic between the first MS (MS1) 210 and the second MS (MS2) 220, to which a local routing is applied, toward the second MS (MS2) 220 through the second BS (BS2) 240 in step 9-8. More particularly, in step 9-8, the ASN GW 810 does not deliver traffic to either the first HA (HA1) 260 or the second HA (HA2) 270.

FIG. 10 is a view which illustrates a packet forwarding table of an ASN GW according to a type A of the first exemplary embodiment of the present invention. Here, the packet forwarding table defines a hierarchical relation between input and output interfaces for specific packets. A higher level in the table denotes a higher priority than a lower level.

Referring to FIG. 10, reference number 1010 indicates a conventional packet forwarding table of the ASN GW. Although actually containing items related to MIP forwarding at the upper part thereof and items related to a normal routing at the lower part thereof, the conventional packet forwarding table 1010 of FIG. 10 shows only the items related to MIP forwarding.

As shown in the conventional table 1010, a packet received from the first MS (MS1) through the incoming interface GRE1 tunnel is set to be output toward the first HA (HA1) through the outgoing interface MIP1 tunnel. Similarly, a packet received from the second MS (MS2) through the incoming interface GRE2 tunnel is set to be outputted toward the second HA (HA2) through the outgoing interface MIP2 tunnel.

Reference number 1020 indicates a packet forwarding table of the ASN GW according to a type A of the first exemplary embodiment of the present invention.

In table 1020, items related to a local routing are placed at the uppermost. Therefore, when a packet transmitted from the first MS (MS1) to the second MS (MS2) is input through the incoming interface GRE1 tunnel, the ASN GW delivers the input packet to the second MS (MS2) through the outgoing interface GRE2 tunnel. That is, for a certain packet to which a local routing is applied, the ASN GW directly transmits it to the recipient station without delivering it to the HA.

Similarly, when a packet transmitted from the second MS (MS2) to the first MS (MS1) is input through the incoming interface GRE2 tunnel, the ASN GW delivers the input packet to the first MS (MS1) through the outgoing interface GRE1 tunnel.

Herein, GRE in a direction from the BS to the ASN GW (i.e., UP link) is different from GRE in a direction from the ASN GW to the BS (i.e., DOWN link). So a correct expression is GRE1_UP/GRE1_DOWN and GRE2_UP/GRE2_DOWN, but they are shortly expressed like GRE1 and GRE2. That is, GRE1 or GRE2 as the incoming interface refers to GRE1_UP or GRE2_UP, whereas GRE1 or GRE2 as the outgoing interface refers to GRE1_DOWN or GRE2_DOWN.

Additionally, a local routing may be canceled when one of participating MSs (i.e., the first MS or the second MS) is withdrawn from the service area of the ASN GW, that is, in case of deregistration or relocation.

Type B of First Exemplary Embodiment

Described hereinafter is an exemplary local routing process of type B in which a local routing is executed between an MS and a local server.

Figure 11:
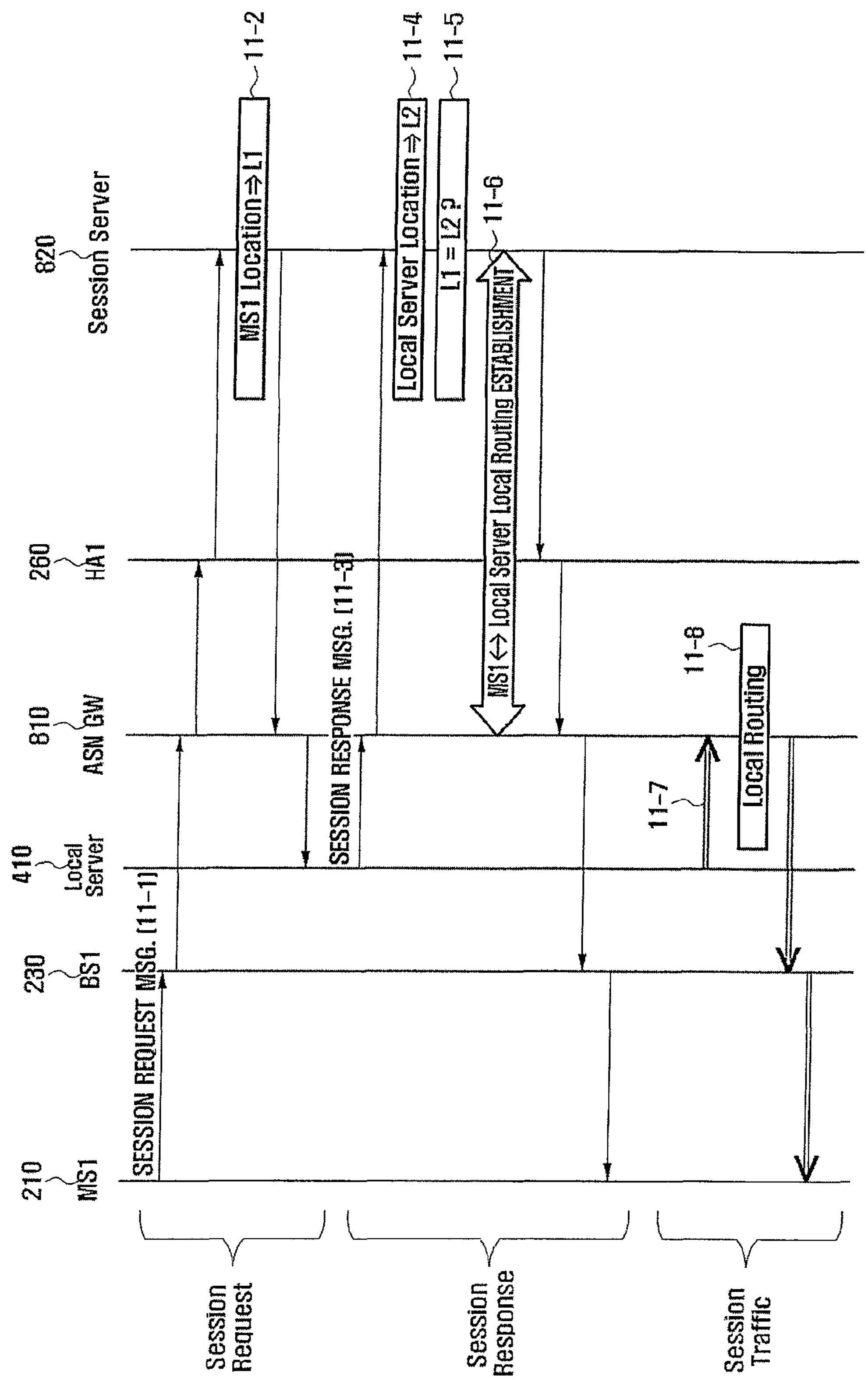
FIG. 11 is a flow diagram which illustrates a process of executing a local routing between a mobile station and a local server according to a type B of the first exemplary embodiment of the present invention.

FIG. 11 is a flow diagram which illustrates a process of executing a local routing between an MS and a local server according to a type B of the first exemplary embodiment of the present invention.

Referring to FIG. 11, the first MS (MS1) 210 sends a session request message to the first BS (BS1) 230 to establish a session with the local server 410 in step 11-1. The session request message is then delivered to the session server 820 via the first BS (BS1) 230, the ASN GW 810, and the first HA (HA1) 260.

When receiving the session request message, the session server 820 may acquire the location information about the first MS (MS1) 210 in step 11-2. A way of obtaining such location information has been already discussed in the above description of step 9-2.

The local server 410 receives the session request message from the session server 820 via the ASN GW 810 and sends a session response message, as a response to the session request message, to the session server 820 via the ASN GW 810 in step 11-3.

Then, in substantially the same way as discussed above in the description of step 9-2, the session server 820 may acquire the location information about the local server 410 in step 11-4. Additionally, the session server 820 compares the location of the first MS (MS1) 210 with the location of the local server 410, and thereby determines whether both are connected together with the same ASN GW 810 in step 11-5. In case of a connection with the same ASN GW 810, the session server 820 requests the establishment of a local routing for traffic between the first MS (MS1) 210 and the local server 410 to the ASN GW 810 in step 11-6. The session server 820 sends the session response message to the first MS (MS1) 210 via the first HA (HA1) 260, the ASN GW 810, and the first BS (BS1) 230.

After a session is established, traffic generated in the local server 410 is transmitted to the ASN GW 810 in step 11-7. The ASN GW 810 performs a direct routing of such traffic between the first MS (MS1) 210 and the local server 410, to which a local routing is applied, toward the first MS (MS1) 210 through the first BS (BS1) 230 in step 11-8. More particularly, in step 11-8, the ASN GW 810 does not deliver traffic to the first HA (HA1) 260.

FIG. 12 is a view which illustrates a packet forwarding table of an ASN GW according to a type B of the first exemplary embodiment of the present invention.

Referring to FIG. 12, reference number 1210 indicates a conventional packet forwarding table of the ASN GW. This packet forwarding table 1210 contains items related to MIP forwarding at the upper part thereof and items related to a normal routing at the lower part thereof.

As shown in the conventional table 1210, a packet received from the first MS (MS1) through the incoming interface GRE1 tunnel is set to be output toward the first HA (HA1) through the outgoing interface MIP1 tunnel.

Reference number 1220 indicates a packet forwarding table of the ASN GW according to a type B of the first exemplary embodiment of the present invention.

In this table 1220, items related to a local routing are placed at the uppermost. Therefore, when a packet transmitted from the first MS (MS1) to the local server is input through the incoming interface GRE1 tunnel, the ASN GW delivers the input packet to the local server through the local interface tunnel as the outgoing interface. That is, for a packet to which a local routing is established between the first MS (MS1) and the local server, the ASN GW directly transmits it to the recipient without delivering it to the first HA (HA1).

Similarly, when a packet transmitted from the local server to the first MS (MS1) is input through the local interface tunnel, the ASN GW delivers the input packet to the first MS (MS1) through the outgoing interface GRE1 tunnel.

Additionally, a local routing may be canceled when one of participating MSs (i.e., the first MS or the local server) is withdrawn from the service area of the ASN GW, that is, in case of deregistration or relocation.

Second Exemplary Embodiment

Figure 13:
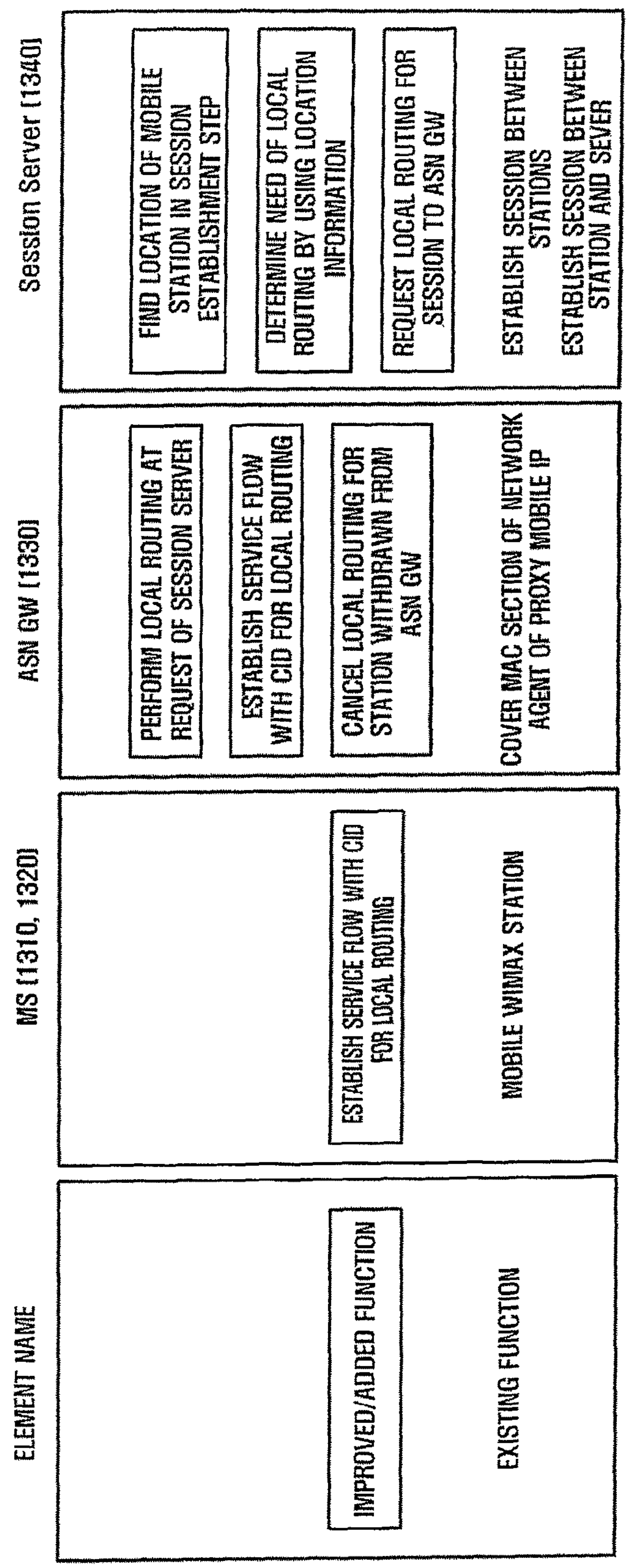
FIG. 13 is a view which illustrates characteristics of mobile stations, an ASN GW and a session server which constitute a system in accordance with a second exemplary embodiment of the present invention.

FIG. 13 is a view which illustrates characteristics of MSs, an ASN GW and a session server which constitute a system in accordance with the second exemplary embodiment of the present invention.

Referring to FIG. 13, a session server 1340, according to the second exemplary embodiment of the invention, ascertains the locations of each MS and the local server in a session establishment step. Additionally, using such location information, the session server 1340 determines whether the MSs or both the MS and the local server are connected with the same ASN GW 1330. Then the session server 1340 further determines whether a local routing is needed. That is, when the MSs or both the MS and the local server are connected together with the same ASN GW 1330, the session server 1340 determines that a local routing is needed. Furthermore, in case where a local routing is needed, the session server 1340 sends a request for a local routing in the current session to the ASN GW 1330.

The ASN GW 1330 according to the second exemplary embodiment of this invention receives a request for a local routing from the session server 1340. Then the ASN GW 1330 applies a new service flow to traffic between the MSs or both the MS and the local server for which a local routing is requested. At the same time, the ASN GW 1330 assigns a special Connection ID CID to the above new service flow. In this exemplary embodiment, the CID specially assigned for a local routing will be referred to as a Local Routing CID (LR CID).

In addition, the ASN GW 1330 routes certain traffic having the LR CID directly to the recipient without delivering such traffic to the HA. Thereafter, the ASN GW 1330 cancels the establishment of a local routing for a certain MS which withdraws from a service area of the ASN GW.

On the other hand, the respective MSs 1310 and 1320 according to the second exemplary embodiment of this invention establish a new service flow with the ASN GW 1330. This service flow has a special CID assigned thereto.

Type A of Second Exemplary Embodiment

Described hereinafter is a local routing process of type A in which a local routing is executed between different MSs according to the second exemplary embodiment of this invention.

Figure 14:
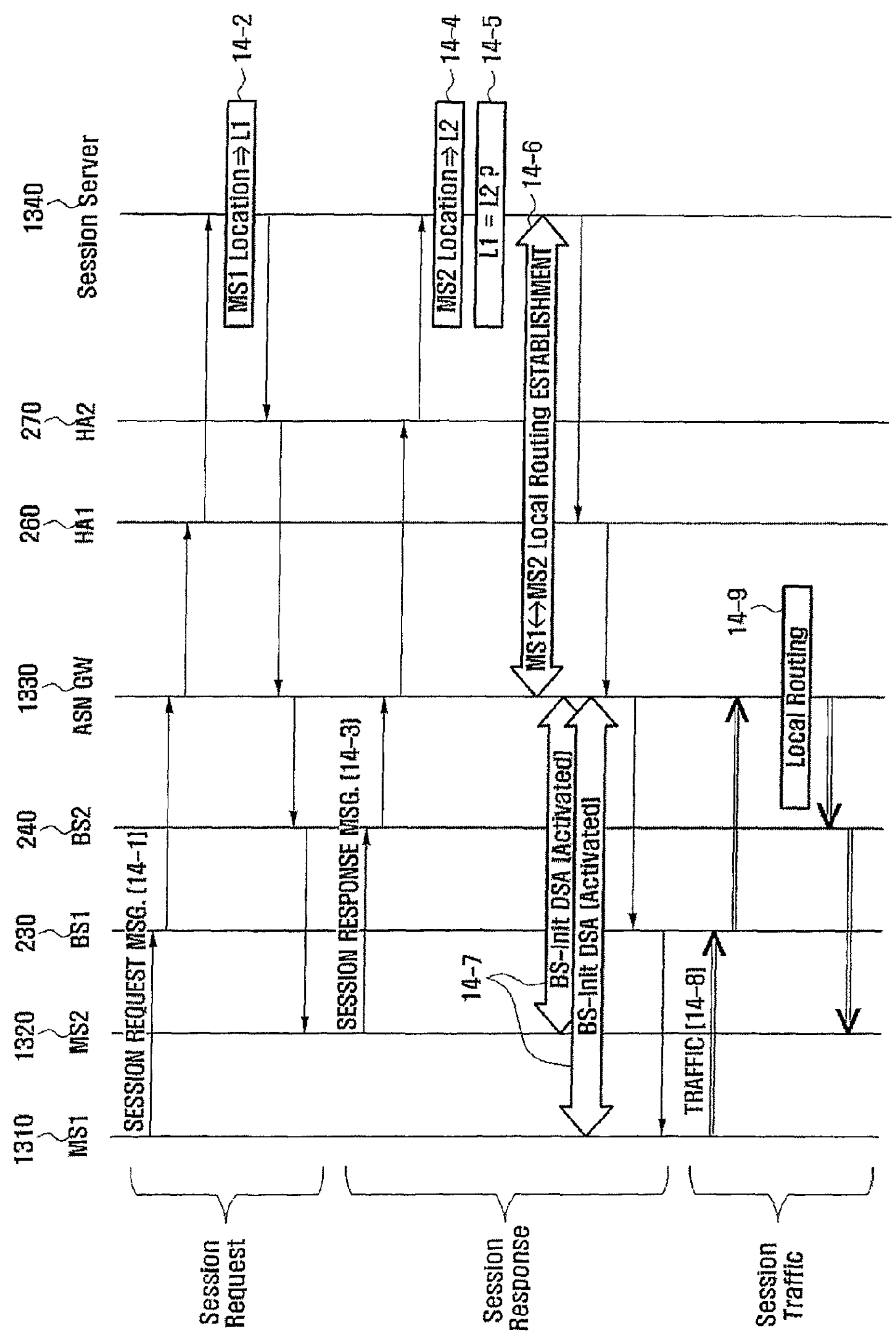
FIG. 14 is a flow diagram which illustrates a process of executing a local routing between different mobile stations according to a type A of the second exemplary embodiment of the present invention.

FIG. 14 is a flow diagram which illustrates a process of executing a local routing between different MSs according to a type A of the second exemplary embodiment of the present invention.

Referring to FIG. 14, the first MS (MS1) 1310 sends a session request message to the first BS (BS1) 230 to establish a session with the second MS (MS2) 1320 in step 14-1. The session request message is then delivered to the session server 1340 via the first BS (BS1) 230, the ASN GW 1330, and the first HA (HA1) 260.

When receiving the session request message, the session server 1340 may acquire the location information about the first MS 1310 in step 14-2. The acquisition of such location information may be performed in substantially the same way as discussed above in the description of step 9-2.

The second MS (MS2) 1320 receives the session request message from the session server 1340 via the second HA (HA2) 270, the ASN GW 1330, and second BS (BS2) 240 and sends a session response message, as a response to the session request message, to the session server 1340 via the second BS (BS2) 240, the ASN GW 1330, and the second HA (HA2) 270 in step 14-3.

Then, in substantially the same way as discussed above in the description of step 9-2, the session server 1340 may acquire the location information about the second MS (MS2) 1320 in step 14-4. Additionally, the session server 1340 compares the location of the first MS (MS1) 1310 with the location of the second MS (MS2) 1320, and thereby determines whether both MSs are connected with the same ASN GW 1330 in step 14-5. In case of a connection with the same ASN GW 1330, the session server 1340 requests the establishment of a local routing for traffic between the first and second MSs 1310 and 1320 to the ASN GW 1330 in step 14-6.

Then, with regard to traffic between the first MS (MS1) 1310 and the second MS (MS2) 1320, the ASN GW 1330 applies a special service flow having the LR CID.

For the above, the ASN GW 1330 performs a Dynamic Service Addition (DSA) process with the first MS (MS1) 1310 and the second MS (MS2) 1320 in step 14-7. This DSA is a BS-initiated (BS-init) DSA. After the DSA process, traffic between the first MS (MS1) 1310 and the second MS (MS2) 1320 is registered as a service flow having a special LR CID.

Then the ASN GW 1330 regards traffic between the first MS (MS1) 1310 and the second MS (MS2) 1320 as a service flow using the LR CID and executes a local routing.

In addition, the session server 1340 sends the session response message to the first MS (MS1) 1310.

After a session is established, traffic generated in the first MS (MS1) 1310 is transmitted to the ASN GW 1330 in step 14-8. Then, by using the LR CID of traffic, the ASN GW 1330 determines whether a local routing is applied to the transmitted traffic. If the LR CID is found, the ASN GW 1330 routes traffic to the second MS (MS2) 1320 through the second BS (BS2) 240 without delivering it to either the first HA (HA1) 260 or the second HA (HA2) 270 in step 14-9.

FIG. 15 is a view which illustrates a packet forwarding table of an ASN GW according to a type A of the second exemplary embodiment of the present invention. FIG. 15 shows a case of the table for profile C having specialized additional GRE tunnels for a local routing.

Referring to FIG. 15, a conventional packet forwarding table 1510 is similar to the aforesaid conventional table 1010 in FIG. 10, so a description thereof will be omitted herein.

Reference number 1520 indicates a packet forwarding table of the ASN GW for profile C according to a type A of the second exemplary embodiment of the present invention.

In this table 1520 for profile C, traffic between the first MS (MS1) and the second MS (MS2) is regarded as a special service flow having the LR CID, and specialized GRE tunnels such as GRE1a and GRE2a are additionally formed.

When a packet having LR CID and transmitted to the second MS (MS2) is input through the specialized incoming interface GRE1a tunnel, the ASN GW outputs the input packet through the specialized outgoing interface GRE2a tunnel.

Similarly, when a packet having LR CID and transmitted to the first MS (MS1) is input through the specialized incoming interface GRE2a tunnel, the ASN GW outputs the input packet through the specialized outgoing interface GRE1a tunnel.

FIG. 16 is a view which illustrates another packet forwarding table of an ASN GW according to a type A of the second exemplary embodiment of the present invention. FIG. 16 shows a case of the table for profile A which has no specialized GRE tunnel for a local routing.

Referring to FIG. 16, a conventional packet forwarding table 1610 is the same table as shown in FIG. 15, and therefore a description thereof will be omitted herein.

Reference number 1620 indicates a packet forwarding table of the ASN GW for profile A according to a type A of the second exemplary embodiment of the present invention.

In this table 1620 for profile A, although traffic between the first MS (MS1) and the second MS (MS2) is regarded as a special service flow having the LR CID, no specialized GRE tunnel is formed.

When a packet having LR CID and transmitted to the second MS (MS2) is input through the incoming interface GRE1 tunnel, the ASN GW outputs the input packet through the outgoing interface GRE2 tunnel.

Similarly, when a packet having LR CID and transmitted to the first MS (MS1) is input through the incoming interface GRE2 tunnel, the ASN GW outputs the input packet through the outgoing interface GRE1 tunnel.

Type B of Second Exemplary Embodiment

Described hereinafter is a local routing process of type B in which a local routing is executed between the MS and the local server according to the second exemplary embodiment of this invention.

Figure 17:
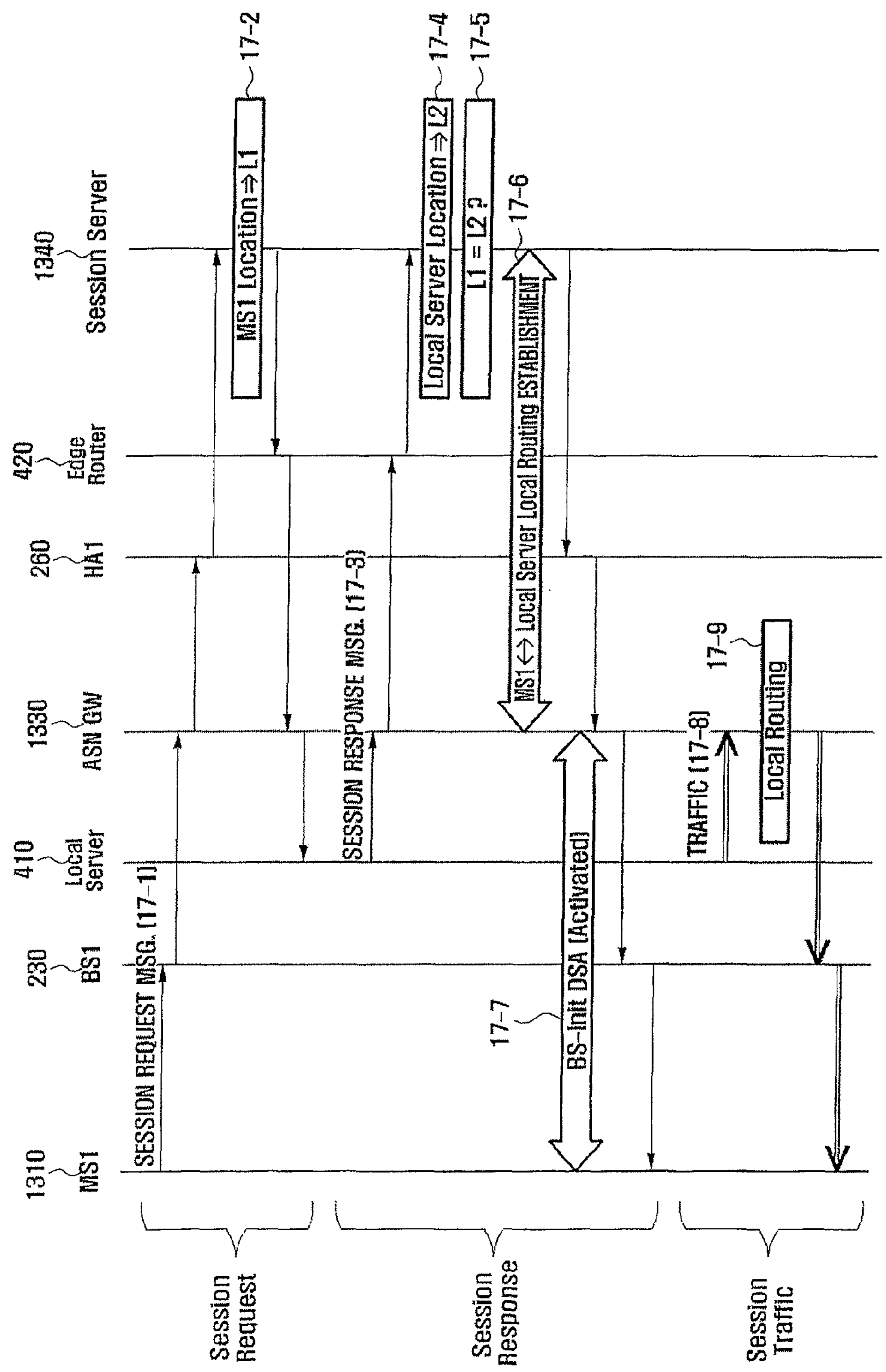
FIG. 17 is a flow diagram which illustrates a process of executing a local routing between an MS and a local server according to a type B of the second exemplary embodiment of the present invention.

FIG. 17 is a flow diagram which illustrates a process of executing a local routing between an MS and a local server according to a type B of the second exemplary embodiment of the present invention.

Referring to FIG. 17, the first MS (MS1) 1310 sends a session request message to first BS (BS1) 230 to establish a session with the local server 410 in step 17-1. The session request message is then delivered to the session server 1340 via the first BS (BS1) 230, the ASN GW 1330, and the first HA (HA1) 260.

When receiving the session request message, the session server 1340 may acquire the location information about the first MS 1310 in step 17-2. The acquisition of such location information may be performed in substantially the same way as discussed above in the description of step 9-2.

The local server 410 receives the session request message from the session server 1340 via the edge router 420 and the ASN GW 1330 and sends a session response message, as a response to the session request message, to the session server 1340 via the ASN GW 1330 and the edge router 420 in step 17-3.

Then, in substantially the same way as discussed above in the description of step 9-2, the session server 1340 may acquire the location information about the local server 410 in step 17-4. Additionally, the session server 1340 compares the location of the first MS (MS1) 1310 with the location of the local server 410, and thereby determines whether both are connected with the same ASN GW 1330 in step 17-5. In case of a connection with the same ASN GW 1330, the session server 1340 requests the establishment of a local routing for traffic between the first MS (MS1) 1310 and the local server 410 to the ASN GW 1330 in step 17-6.

Then, with regard to traffic between the first MS (MS1) 1310 and the local server 410, the ASN GW 1330 applies a special service flow having the LR CID.

For the above, the ASN GW 1330 performs a DSA process with the first MS (MS1) 1310 in step 17-7. This DSA is a BS-initiated (BS-init) DSA. After the DSA process, traffic between the first MS 1310 and the local server 410 is registered as a service flow having a special LR CID.

Then the ASN GW 1330 regards traffic between the first MS 1310 and the local server 410 as a service flow using the LR CID and executes a local routing.

In addition, the session server 1340 sends the session response message to the first MS 1310.

After a session is established, traffic generated in the local server 410 is transmitted to the ASN GW 1330 in step 17-8. Then the ASN GW 1330 routes traffic, which has the LR CID and is transmitted between the first MS (MS1) 1310 and the local server 410, to the first MS (MS1) 1310 through the first BS (BS1) 230 without delivering such traffic to the first HA (HA1) 260 or edge router 420 in step 17-9.

FIG. 18 is a view which illustrates a packet forwarding table of an ASN GW according to a type B of the second exemplary embodiment of the present invention. FIG. 18 shows a case of the table for profile C.

Referring to FIG. 18, a conventional packet forwarding table 1810 is similar to the aforesaid conventional table 1210 in FIG. 12, so a description thereof will be omitted herein.

Reference number 1820 indicates a packet forwarding table of the ASN GW for profile C according to a type B of the second exemplary embodiment of the present invention.

In table 1820 for profile C, traffic between the first MS (MS1) and the local server is regarded as a special service flow having the LR CID, and a specialized GRE tunnel GRE1a is additionally formed.

When a packet having LR CID and transmitted to the local server is input through the specialized incoming interface GRE1a tunnel, the ASN GW outputs the input packet through the local interface tunnel as the outgoing interface.

Similarly, when a packet having LR CID and transmitted to the first MS (MS1) is input through the local interface tunnel as the incoming interface, the ASN GW outputs the input packet through the specialized outgoing interface GRE1a tunnel.

FIG. 19 is a view which illustrates another packet forwarding table of an ASN GW according to a type B of the second exemplary embodiment of the present invention. FIG. 19 shows a case of the table for profile A which has no specialized GRE tunnel for a local routing.

Referring to FIG. 19, a conventional packet forwarding table 1910 is substantially the same as table 1810 as shown in FIG. 18, and therefore a description thereof will be omitted herein.

Reference number 1920 indicates a packet forwarding table of the ASN GW for profile A according to a type B of the second exemplary embodiment of the present invention.

When a packet having LR CID and transmitted to the local server is input through the incoming interface GRE1 tunnel, the ASN GW outputs the input packet through the local interface as the outgoing interface.

Similarly, when a packet having LR CID and transmitted to the first MS (MS1) is input through the local interface as the incoming interface, the ASN GW outputs the input packet through the outgoing interface GRE1 tunnel.

Third Exemplary Embodiment

Figure 20:
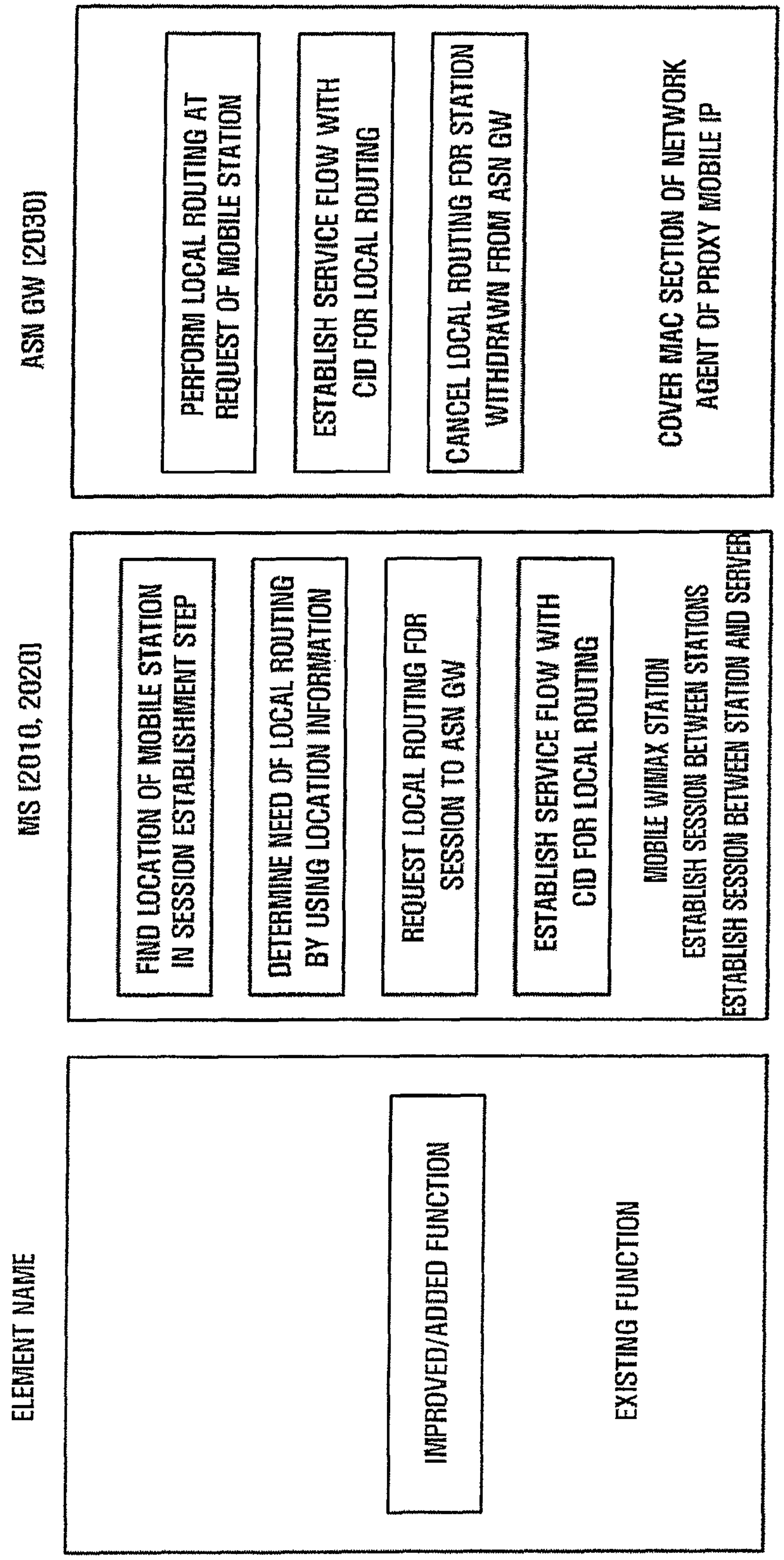
FIG. 20 is a view which illustrates characteristics of mobile stations and an ASN GW which constitute a system in accordance with a third exemplary embodiment of the present invention.

FIG. 20 is a view which illustrates characteristics of MSs and an ASN GW which constitute a system in accordance with the third exemplary embodiment of the present invention.

Referring to FIG. 20, the MSs 2010 and 2020 of the third exemplary embodiment are characterized by mutually establishing a session without using the session server. The respective MSs 2010 and 2020 ascertain the locations of the other MS and the local server in a session establishment step. Additionally, using such location information, the MSs 2010 and 2020 determine whether the MSs or both the MS and the local server are connected with the same ASN GW 2030. Then the MSs 2010 and 2020 further determine whether a local routing is needed. That is, when the MSs or both the MS and the local server are connected together with the same ASN GW 2030, the MSs 2010 and 2020 determine that a local routing is needed. Furthermore, in a case in which a local routing is needed, the MSs 2010 and 2020 send a request for a local routing to the ASN GW 2030. In addition, the MSs 2010 and 2020 establish a new service flow with the ASN GW 2030 and assign special CIDs to the service flow.

The ASN GW 2030 according to the third exemplary embodiment of this invention receives a request for a local routing from the MSs 2010 and 2020. Then the ASN GW 2030 applies a new service flow to traffic between the MSs or both the MS and the local server for which a local routing is requested. In addition, the ASN GW 2030 routes certain traffic having LR CID directly to the recipient without delivering such traffic to the HA. Thereafter, the ASN GW 2030 cancels the establishment of a local routing for a certain MS which withdraws from a service area of the ASN GW.

Type A of Third Exemplary Embodiment

Described hereinafter is a local routing process of type A in which a local routing is executed between different MSs according to the third exemplary embodiment of this invention.

Figure 21:
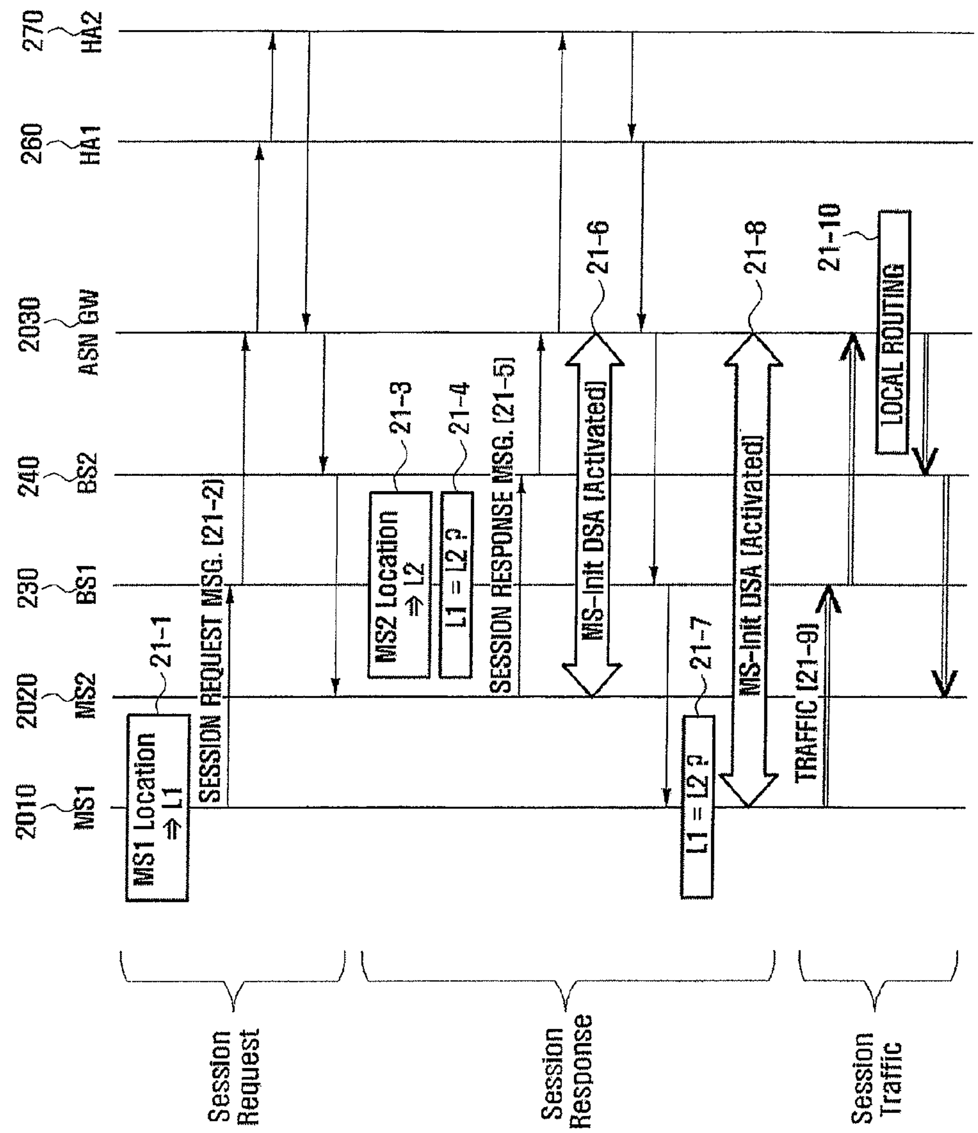
FIG. 21 is a flow diagram which illustrates a process of executing a local routing between different mobile stations according to a type A of the third exemplary embodiment of the present invention.

FIG. 21 is a flow diagram which illustrates a process of executing a local routing between different MSs according to a type A of the third exemplary embodiment of the present invention.

Referring to FIG. 21, the first MS (MS1) 2010 determines its own location and puts the location information into a session request message in step 21-1. Here, the determination of such location information has been already discussed above and is well known in the art, so a description thereof will be omitted.

Next, the first MS (MS1) 2010 sends the session request message to the second MS (MS2) 2020 in step 21-2. Then the session request message passes through the first BS (BS1) 230, the ASN GW 2030, the first HA (HA1) 260, the second HA (HA2) 270, the ASN GW 2030, and the second BS (BS2) 240, and finally arrives at the second MS (MS2) 2020. Therefore, the session request message is not delivered to the session server.

When receiving the session request message, the second MS (MS2) 2020 acquires its own location in step 21-3. Then the second MS (MS2) 2020 determines whether the first MS (MS1) 2010 and the second MS (MS2) 2020 are connected with the same ASN GW 2030, by using their location information in step 21-4. In case of a connection with the same ASN GW 2030, the second MS (MS2) 2020 registers traffic between both MSs as a service flow having a special LR CID in the ASN GW 2030. For the above, the second MS (MS2) 2020 performs a MS-initiated (MS-init) DSA in step 21-6.

Separately from the above DSA process, the second MS (MS2) 2020 sends a session response message, as a response to the session request message, to the first MS (MS1) 2010 in step 21-5. Here, the session response message may contain the location information about the second MS (MS2) 2020 therein.

The first MS (MS1) 2010 receives the session response message and determines whether the first MS (MS1) 2010 and the second MS (MS2) 2020 are connected with the same ASN GW 2030, by using their location information in step 21-7. In case of a connection with the same ASN GW 2030, the first MS (MS1) 2010 registers traffic between both MSs as a service flow having a special LR CID in the ASN GW 2030. For the above, the first MS (MS1) 2010 performs an MS-initiated (MS-init) DSA in step 21-8. After the DSA process, traffic between the first MS (MS1) 2010 and the second MS (MS2) 2020 is registered as a service flow having a special LR CID.

Then the ASN GW 2030 regards traffic between the first MS (MS1) 2010 and the second MS (MS2) 2020 as a service flow using the LR CID and executes a local routing.

After a session is established, traffic generated in the first MS (MS1) 2010 is transmitted to the ASN GW 2030 in step 21-9. Then, by using the LR CID of traffic, the ASN GW 2030 determines whether a local routing is applied to the transmitted traffic. If the LR CID is found, the ASN GW 2030 routes traffic to the second MS (MS2) 2020 without delivering it to either the first HA (HA1) 260 or the second HA (HA2) 270 in step 21-10.

FIG. 22 is a view which illustrates a packet forwarding table of an ASN GW according to a type A of the third exemplary embodiment of the present invention. FIG. 22 shows a case of the table for profile C having specialized additional GRE tunnels for a local routing.

Referring to FIG. 22, since a conventional packet forwarding table 2210 is similar to the aforesaid conventional table, a description thereof will be omitted herein.

Reference number 2220 indicates a packet forwarding table of the ASN GW for profile C according to a type A of the third exemplary embodiment of the present invention.

In table 2220 for profile C, traffic between the first MS (MS1) and the second MS (MS2) is regarded as a special service flow having the LR CID, and specialized GRE tunnels such as GRE1a and GRE2a are additionally formed.

When a packet having LR CID and transmitted to the second MS (MS2) is input through the specialized incoming interface GRE1a tunnel, the ASN GW outputs the input packet through the specialized outgoing interface GRE2a tunnel.

Similarly, when a packet having LR CID and transmitted to the first MS (MS1) is input through the specialized incoming interface GRE2a tunnel, the ASN GW outputs the input packet through the specialized outgoing interface GRE1a tunnel.

FIG. 23 is a view which illustrates another packet forwarding table of an ASN GW according to a type A of the third exemplary embodiment of the present invention. FIG. 23 shows a case of the table for profile A which has no specialized GRE tunnel for a local routing.

A conventional packet forwarding table 2310 is substantially the same table as shown in FIG. 22, and therefore a description thereof will be omitted herein.

Reference number 2320 indicates a packet forwarding table of the ASN GW for profile A according to a type A of the third exemplary embodiment of the present invention.

In table 2320 for profile A, although traffic between the first MS (MS1) and the second MS (MS2) is regarded as a special service flow having the LR CID, no specialized GRE tunnel is formed.

When a packet having LR CID and transmitted to the second MS (MS2) is input through the incoming interface GRE1 tunnel, the ASN GW outputs the inputted packet through the outgoing interface GRE2 tunnel.

Similarly, when a packet having LR CID and transmitted to the first MS (MS1) is input through the incoming interface GRE2 tunnel, the ASN GW outputs the input packet through the outgoing interface GRE1 tunnel.

Type B of Third Exemplary Embodiment

Described hereinafter is a local routing process of type B in which a local routing is executed between an MS and a local server according to the third exemplary embodiment of this invention.

Figure 24:
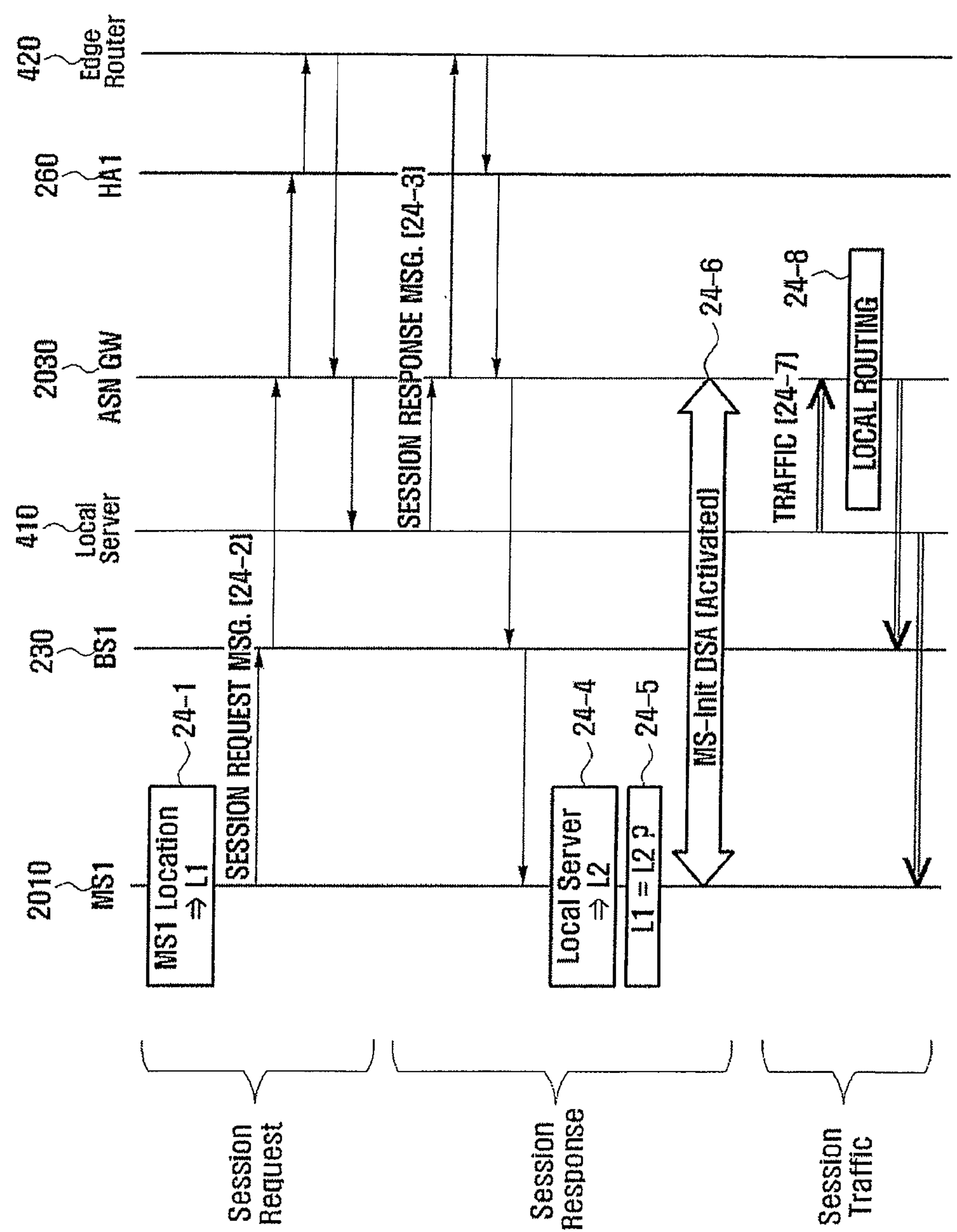
FIG. 24 is a flow diagram which illustrates a process of executing a local routing between an MS and a local server according to a type B of the third exemplary embodiment of the present invention.

FIG. 24 is a flow diagram which illustrates a process of executing a local routing between an MS and a local server according to a type B of the third exemplary embodiment of the present invention.

Referring to FIG. 24, the first MS (MS1) 2010 acquires its own location and puts the location information into a session request message in step 24-1. Then the first MS (MS1) 2010 sends the session request message to the local server 410 in step 24-2. The session request message is not delivered to the session server.

When receiving the session request message, the local server 410 sends a session response message containing its own location to the first MS (MS1) 2010 in step 24-3.

When receiving the session response message, the first MS (MS1) 2010 may obtain the location information about the local server 410 in step 24-4. Then the first MS (MS1) 2010 determines whether the first MS (MS1) 2010 and the local server 410 are connected with the same ASN GW 2030, by using their location information in step 24-5. In case of a connection with the same ASN GW 2030, the first MS (MS1) 2010 registers traffic between the first MS (MS1) 2010 and the local server 410 as a service flow having a special LR CID in the ASN GW 2030. For the above, the first MS (MS1) 2010 performs an MS-initiated (MS-init) DSA in step 24-6. After the DSA process, traffic between the first MS (MS1) 2010 and the local server 410 is registered as a service flow having a special LR CID.

Then the ASN GW 2030 regards traffic between the first MS (MS1) 2010 and the local server 410 as a service flow using the LR CID and executes a local routing.

After a session is established, traffic generated in the local server 410 is transmitted to the ASN GW 2030 in step 24-7. Then the ASN GW 2030 routes traffic between the first MS (MS1) 2010 and the local server 410 to the first MS (MS1) 2010 through the first BS (BS1) 230 without delivering such traffic to either the first HA (HA1) 260 or the edge router 420 in step 24-8.

FIG. 25 is a view which illustrates a packet forwarding table of an ASN GW according to a type B of the third exemplary embodiment of the present invention. FIG. 25 shows a case of the table for profile C.

Referring to FIG. 25, since a conventional packet forwarding table 2510 is similar to the aforesaid conventional table, a description thereof will be omitted herein.

Reference number 2520 indicates a packet forwarding table of the ASN GW for profile C according to a type B of the third exemplary embodiment of the present invention.

In table 2520 for profile C, traffic between the first MS (MS1) and the local server is regarded as a special service flow having the LR CID, and a specialized GRE tunnel GRE1a is additionally formed.

When a packet having LR CID and transmitted to the local server is input through the specialized incoming interface GRE1a tunnel, the ASN GW outputs the input packet through the local interface tunnel as the outgoing interface.

Similarly, when a packet having LR CID and transmitted to the first MS (MS1) is input through the local interface tunnel as the incoming interface, the ASN GW outputs the input packet through the specialized outgoing interface GRE1a tunnel.

FIG. 26 is a view which illustrates another packet forwarding table of an ASN GW according to a type B of the third exemplary embodiment of the present invention. FIG. 26 shows a case of the table for profile A which has no specialized GRE tunnel for a local routing.

Referring to FIG. 26, since a conventional packet forwarding table 2610 is similar to the aforesaid conventional table, a description thereof will be omitted herein.

Reference number 2620 indicates a packet forwarding table of the ASN GW for profile A according to a type B of the third exemplary embodiment of the present invention.

In table 2620 for profile A, although traffic between the first MS (MS1) and the local server is regarded as a special service flow having the LR CID, no specialized GRE tunnel is formed.

When a packet having LR CID and transmitted to the local server is input through the incoming interface GRE1 tunnel, the ASN GW outputs the input packet through the local interface as the outgoing interface.

Similarly, when a packet having LR CID and transmitted to the first MS (MS1) is input through the local interface as the incoming interface, the ASN GW outputs the input packet through the outgoing interface GRE1 tunnel.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for establishing a local routing in a network node in a mobile communication network, the method comprising:

receiving a request for local routing from a server, if it is determined that a first mobile station and a second mobile station are connected with a same network node;

configuring, in response to the request for local routing, a service flow for a traffic transmitted from one of the first mobile station and the second mobile station to another mobile station;

assigning a Local Routing Connection Identifier (LR CID) to the service flow for classifying traffic between the first mobile station and the second mobile station as a service flow including LR CID for a local routing between the first mobile station and the second mobile station at the network node;

establishing, in response to the configuration of the service flow, a dedicated Generic Routing Encapsulation (GRE) tunnel corresponding to the LR CID;

receiving a specific traffic from one of the first mobile station and the second mobile station; and transmitting, when the specific traffic include the LR CID, the specific traffic to another mobile station without routing the specific traffic to a Core Network.

2. The method of claim 1, wherein the second mobile station comprises a local server.

3. The method of claim 1, wherein the specific traffic is received via an input interface of the dedicated GRE tunnel, and the specific traffic is transmitted via an output interface of the dedicated GRE tunnel.

4. The method of claim 1, further comprising:

at the server, receiving a session request message from the first mobile station through the network node and determining location information about the first mobile station, receiving a session response message from the second mobile station through the network node and determining location information about the second mobile station, determining whether the first mobile station and the second mobile station are connected with the same network node, by using the location information about both the first mobile station and the second mobile station, transmitting the request for local routing, if it is determined that a first mobile station and a second mobile station are connected with the same network node.

5. The method of claim 1, wherein the configuring of a service flow for a traffic comprises performing a Dynamic Service Addition (DAS) procedure to each serving base station of the first mobile station and the second mobile station.

6. An apparatus for establishing a local routing in a network node in a mobile communication network, the apparatus comprising:

a transceiver configured to transmit and receive a signal; and a controller configured to control to receive a request for local routing from a server, if it is determined that a first mobile station and a second mobile station are connected with a same network node, to configure, in response to the request for local routing, a service flow for a traffic transmitted from one of the first mobile station and the second mobile station to another mobile station, to assign a Local Routing Connection Identifier (LR CID) to the service flow for classifying traffic between the first mobile station and the second mobile station as a service flow including LR CID for a local routing between the first mobile station and the second mobile station at the network node, to establish, in response to the configuration of the service flow, a dedicated Generic Routing Encapsulation (GRE) tunnel corresponding to the LR CID, to receive a specific traffic from one of the first mobile station and the second mobile station, and to transmit, when the specific traffic include the LR CID, the specific traffic to another mobile station without routing the specific traffic to a Core Network.

7. The apparatus of claim 6, wherein the second mobile station comprises a local server.

8. The apparatus of claim 6, wherein the specific traffic is received via an input interface of the dedicated GRE tunnel, and the specific traffic is transmitted via an output interface of the dedicated GRE tunnel.

9. The apparatus of claim 6, wherein the request for local routing is transmitted, when it is determined that the first mobile station and the second mobile station are connected with the same network node, by using location information received from the first mobile station and second station.

10. The apparatus of claim 6, wherein the controller is further configured to perform a Dynamic Service Addition (DAS) procedure to each serving base station of the first mobile station and the second mobile station for the service flow.

11. A method for establishing a local routing in a mobile communication network, the method comprising:

at a second mobile station, receiving a session request message from a first mobile station via a network node and determining location information about the first mobile station;

at the second mobile station, determining whether the first mobile station and the second mobile station are connected with a same network node, and, if it is determined that the first mobile station and the second mobile station are connected with the same network node, establishing a first local routing with the first mobile station in the network node so that traffic toward the first mobile station is directly routed to the first mobile station at the network node;

at the first mobile station, receiving a session response message from the second mobile station via the network node and determining location information about the second mobile station; and at the first mobile station, determining whether the first mobile station and the second mobile station are connected with the same network node, and, if it is determined that the first mobile station and the second mobile station are connected with the same network node, establishing a second local routing with the second mobile station in the network node so that traffic toward the second mobile station is directly routed to the second mobile station at the network node, wherein each of the establishing of the first local routing and the establishing of the second local routing comprises registering a service flow for the traffic by the network node, wherein the registering of the service flow comprises assigning a Local Routing Connection Identifier (LR CID) to the service flow by the network node and establishing dedicated Generic Routing Encapsulation (GRE) tunnel corresponding to the LR CID, and wherein the network node regards traffic between the first MS and the second MS as a service flow using the LR CID; and at the network node, when receiving the traffic from one of the first mobile station and the second mobile station via an input interface of the dedicated GRE tunnel, transmitting the traffic to the other according to the first local routing and the second local routing via an output interface of the dedicated GRE tunnel.

12. A system for establishing a local routing in a mobile communication network, the system comprising:

a second mobile station configured to determine whether a first mobile station and the second mobile station are connected with a same network node by receiving a session request message containing location information from the first mobile station, and if the first mobile station and the second mobile station are connected with the same network node, to establish a first local routing with the first mobile station in the network node so that traffic toward the first mobile station is directly routed to the first mobile station at the network node, wherein the first mobile station is configured to determine whether the first mobile station and the second mobile station are connected with the same network node by receiving a session response message containing location information from the second mobile station, and if it is determined that the first mobile station and the second mobile station are connected with the same network node, to establish a second local routing with the second mobile station in the network node so that traffic toward the second mobile station is directly routed to the second mobile station at the network node, wherein the network node is configured to, when receiving the traffic from one of the first mobile station and the second mobile station, transmit the traffic to the other according to the first local routing and the second local routing, wherein the network node is further configured to register a service flow for the traffic, and wherein the network node is further configured to control to assign a Local Routing Connection Identification (LR CID) to the service flow and to establish dedicated Generic Routing Encapsulation (GRE) tunnel corresponding to the LR CID and to execute a local routing by regarding traffic between the first MS and the second MS as a service flow using the LR CID via an input interface of the dedicated GRE tunnel and an output interface of the dedicated GRE tunnel.

* * * * *